United States Patent
Schöb

(10) Patent No.: US 6,898,984 B2
(45) Date of Patent: May 31, 2005

(54) MEASURING APPARATUS TO DETERMINE THE FLOW OF A FLUID

(75) Inventor: Reto Schöb, Rudolfstetten (CH)

(73) Assignee: Levitronix LLC, Waltham, MA (US)

( * ) Notice: Subject to any disclaimer, the term of this patent is extended or adjusted under 35 U.S.C. 154(b) by 0 days.

(21) Appl. No.: 10/640,427

(22) Filed: Aug. 7, 2003

(65) Prior Publication Data

US 2004/0045368 A1 Mar. 11, 2004

(30) Foreign Application Priority Data

Aug. 16, 2002 (EP) .............................. 02405704

(51) Int. Cl.⁷ .............................. G01F 1/56; G01F 3/14
(52) U.S. Cl. ................... 73/861.08; 73/239; 73/861.53
(58) Field of Search .............................. 73/861.08, 239, 73/861.53

(56) References Cited

U.S. PATENT DOCUMENTS

| | | | |
|---|---|---|---|
| 3,662,598 A | | 5/1972 | Spencer |
| 4,003,255 A | | 1/1977 | Spencer |
| 4,619,146 A | | 10/1986 | Teodorescu et al. |
| 5,303,738 A | * | 4/1994 | Chang et al. ............. 73/861.53 |
| 5,392,648 A | * | 2/1995 | Robertson ................. 73/239 |
| 6,339,959 B1 | * | 1/2002 | Natapov ..................... 73/239 |

FOREIGN PATENT DOCUMENTS

| | | |
|---|---|---|
| DE | 2553454 | 6/1977 |
| DE | 19624974 C1 | 1/1998 |
| EP | 0971212 A1 | 1/2000 |

* cited by examiner

*Primary Examiner*—Harshad Patel
(74) *Attorney, Agent, or Firm*—Townsend and Townsend and Crew LLP

(57) ABSTRACT

A measuring apparatus (1) for determining the flow (Q) of a fluid (2). The apparatus has a hollow body (3), with an inflow (4) and an outflow (5) for the fluid (2). A magnetic sample (6) is movably arranged in the hollow body (3) and can be acted upon with a working pressure by the fluid (2). The measuring apparatus (1) further has at least one position sensor (7) to determine the position of the magnetic sample (6), an electromagnet (8) to exert a magnetic force on the magnetic sample (6), and a control device (9) for the electromagnet (8) which is connected signal-wise to the position sensor (7). The control device (9) includes regulating means (10) which control the electromagnet (8) with the aid of a signal of the position sensor (7) so that the magnetic sample (6) is held in a position (X) against the working pressure, with the magnetic sample (6) being designed and arranged such that the fluid (2) can flow through the hollow body (3) from the inflow (4) to the outflow (5).

25 Claims, 17 Drawing Sheets

US 6,898,984 B2

MEASURING APPARATUS TO DETERMINE THE FLOW OF A FLUID

BACKGROUND OF THE INVENTION

The invention relates to a measuring apparatus and to a method of determining the flow of a fluid and to the use of the measuring apparatus.

Flow measuring systems for the determination of the flow of a fluid, for example through a line or a pipe, are known for different applications in different embodiments. To determine the flow of fluids of low density, in particular of gases, apparatuses are widely used which have a vertical flow pipe through which the gas flows from the bottom to the top and which has a suspended body which is held in a defined position in a state of equilibrium between the gravitational force acting on the suspended body and the upwardly acting force of the gas flowing past it, with the position of equilibrium of the floating body in the flow pipe being a measure for the amount of gas flowing through per time unit. In this connection, such flow measuring systems are frequently only designed with a visual display without a transmission function and cannot be operated with a horizontally aligned flow pipe.

Other known systems work with an orifice and a resistor of truncated cone shape which is arranged in front of the orifice in a hollow space, with the hollow space having an inflow opening and an outflow opening and with a fluid flowing through it whose flow should be determined. In this connection, the flow rate of the fluid should be determined from the difference between the pressures which are measured in front of the orifice and behind the orifice and from the position of the resistor. The size of the flow opening of the orifice is variable such that the pressure differential, which drops over the orifice, can be kept constant by means of a control unit.

Furthermore, flow measuring systems are known in which a movably arranged measuring element is acted upon by a pressure differential of a fluid flowing through a hollow body, with a force being exerted onto the measuring element such that the measuring element is stabilized in a fixedly pre-set zero position independently of the flow of the fluid. In EP 0 101 815 A1, a flow measuring system is shown comprising a venturi and a measuring device which includes a magnetic measuring element movably mounted in a hollow cylinder and connected to the venturi. The measuring element is acted upon by a pressure differential built up by the fluid flowing through the venturi and is thereby subjected to a deflecting force, with the measuring element preferably being a freely movable, permanently magnetic piston with which a light barrier is associated as a position sensor. In this connection, the measuring element is stabilized in a zero position with the aid of a control unit which cooperates with the position sensor to determine the position of the measuring element by a positionally independent magnetic restoring force, which is produced by an electromagnet.

However, this arrangement has a series of disadvantages. To realize a stable zero position of the measuring element, the magnetic restoring force in the flow measuring system disclosed in EP 0 101 815 A1 must be at least partly compensated by a second counter-force acting in the opposite direction. This counter-force can, for example, be the weight of the measuring element. For this purpose, the measuring device is arranged such that the measuring element can move vertically and is partly drawn in upwardly into the coil. The stable zero position, that is the position of the measuring element without a flow of the fluid through the venturi, is then where the magnetic force on the measuring element is opposite and equal to the weight of the measuring element. This means that this arrangement cannot be operated with a horizontal position of the hollow cylinder in which the measuring element is arranged. If, by a suitable selection of the mean density of the measuring element, its weight is set opposite and equal to the buoyancy forces in the fluid, the arrangement can admittedly be operated independently of the position of the hollow cylinder, but the counter-force required to stabilize the zero position must be produced by an additional electromagnet. The arrangement thus becomes a lot more complex and expensive since not only an additional electromagnet, but also the control units required for this have to be installed. In this connection, this arrangement is generally relatively complex and expensive in its design due to the use of a venturi with a separate measuring device. The measuring element, which is acted upon to measure the flow of the fluid from the pressure differential of the venturi, must be arranged in a hollow cylinder separate from the venturi. This has the consequence that the measuring device has to be connected to the venturi by additional connection means, for example by pressure lines. Furthermore, this flow measuring system only provides reliable measurement results when the flow of the fluid through the venturi is proportional to the output signal of the control unit, that is only when, in accordance with Bernoulli's equation, the differential pressure in the venturi is proportional to the square of the flow of the fluid. This simple relationship is, however, only rarely present and in practice much more complicated relationships frequently occur between the flow of the fluid and the pressure differential which occurs. As a rule, the pressure differential occurring in the venturi depends in particular on different parameters of the liquid such as on the viscosity or on the density so that the specific functional relationship between flow and pressure differential can also depend, among other things, on the type of liquid to be measured.

It is therefore the object of the invention to provide an improved measuring apparatus to determine the flow of a fluid in which the disadvantages known from the prior art have been avoided.

In accordance with the invention, a measuring apparatus is thus proposed to determine the flow of a fluid which includes a hollow body which has an inflow and an outflow (an inlet and an outlet) for the fluid. A magnetic sample is movably arranged in the hollow body and can be acted upon with a working pressure by the fluid. The measuring apparatus further includes at least one position sensor to determine the position of the magnetic sample, an electromagnet to exert a magnetic force on the magnetic sample and a control device for the electromagnet which is connected signal-wise to the position sensor, with the control device including regulating means which control the electromagnet with the help of a signal of the position sensor such that the magnetic sample is held in a position against the working pressure. The sample is designed and arranged such that the fluid can flow through the hollow body from the inflow to the outflow.

In a preferred embodiment of the measuring apparatus in accordance with the invention, the magnetic sample is arranged with respect to the electromagnetic in the hollow body such that a stable zero position of the sample can be realized solely by the electromagnet which, by exerting a magnetic force on the sample, can hold this in a pre-settable position against the working pressure of the flowing fluid. This means that, to stabilize the sample in the zero position, that is in that position which the sample adopts without flow of the fluid through the hollow body, no second force such as the weight of the sample or a second magnetic force is required which acts opposite to the magnetic force of the electromagnet. This can be achieved in that the magnetic sample in the zero position is correspondingly oriented in the axial direction with respect to the field line profile of the electromagnet and is symmetrically arranged. A restoring force always acts on the sample in the direction towards the zero position independently of the direction of an axial deflection.

In accordance with the invention, the flow through the hollow body is determined in that the magnetic sample is held in a position against the working pressure by the magnetic force of the electromagnet, with the electromagnet being able to cooperate with the sample such that no substantial movements of the sample take place with respect to the hollow body in the operating state on a change in the flow. This is in particular of advantage when, for example, the flow of a liquid which is prone to particle formation, or the flow of an aggressive liquid such as a polishing liquid, should be determined. Since the sample only moves in a low amount with respect to the hollow body, wear by friction effects is minimized, with the sample, in a special variant, also being able to change its position on a change of the flow, with the flow then being able to be determined from the change of position.

An important characteristic of the invention consists of the fact that the sample is designed and the hollow body is arranged such that flowing fluid flows around or flows through the sample and it is thereby acted upon by a working pressure which is a measure for the flow of the fluid through the hollow body. A separate measuring device outside the hollow body through which fluid flows, such as is known from the prior art, can thereby be dispensed with.

In a preferred embodiment of a measuring apparatus in accordance with the invention to determine the flow of a fluid, the hollow body has a circular flow cross-section and is designed, for example, in the form of a cylindrical pipe. A preferably plate-shaped magnetic sample is arranged inside the hollow body such that an axis thereof is movable in the axial direction along a longitudinal axis of the hollow body. The magnetic sample can, for example, include a plate-shaped, or ring-shaped, permanent magnet which, depending on the embodiment, can be polarized in the radial or in the axial direction. The sample can in particular also include two magnets magnetized in opposite directions in the axial direction, with such samples being termed within the context of this application as "axially oppositely magnetized samples".

The sample can also, for example, include one or more bar magnets polarized in the direction of the body axis and/or perpendicular thereto or a differently shaped magnet. The sample can furthermore also include, for the direct diversion of the magnetic flow, ferromagnetic components, in particular iron parts in the form of plates or rings. If the magnetic sample substantially includes one or more ferromagnetic, non-permanently magnetic materials such as iron, this is in particular of advantage if the fluid is subject to larger temperature fluctuations. The sample can even include a second electromagnet fed from an electrical energy source, the second electromagnet being fed with electrical energy via feeders which are integrated into possibly present securing means for the sample. In special cases, it is even possible for the sample itself to include the electrical source of source of energy and/or for a combination of the previously mentioned types of magnetic samples to be used.

The hollow body further includes an electromagnet which is suitable to exert a magnetic force on the sample in the substantially axial direction. The electromagnet can include one or more coils which are suitably arranged in a manner known per se in the peripheral direction at the outside of the hollow body or in the wall of the hollow body. When the electromagnetic is stimulated by an electric current, the electromagnetic can enter into cooperation with the magnetic sample and exert a Lorentz force $\vec{F} = \vec{B} \times \vec{I}$ on this, where, as customary, $\vec{B}$ designates the magnetic flux density and $\vec{I}$ designates the electric current through the coil of the electromagnet. In a special embodiment of the measuring apparatus in accordance with the invention, the magnetic sample, which can be magnetized, for example, substantially in the axial direction, can be symmetrically arranged in the axial direction in the operating state in the zero position with respect to the field line profile of the electromagnet and be oriented such that the sample is always subjected to a restoring force in the direction of the zero position with respect to an axial deflection. This means that the zero position of the sample is a stable position of equilibrium with respect to an axial deflection, with—in the context of this application—the zero position being understood as that position in the hollow body which the sample adopts under the effect of a magnetic force of the electromagnet when the flow rate of the fluid through the hollow body disappears, that is when the flow of the fluid through the hollow body is zero.

In another embodiment, the zero position of the sample can be freely selected by the regulation irrespective of the position of the sample with respect to the electromagnet, i.e. the zero position can be individually fixed for each measurement. The magnetic sample can advantageously be magnetized in the radial direction, with the force which the electromagnet exerts on the magnetic sample in the operating state being directly proportional in a good approximation to the flow through the electromagnetic at least with small deflections from a pre-settable zero position.

The position of the sample in the hollow body can be determined by at least one position sensor which is preferably arranged at the outside of or in the wall of the hollow body, especially also inside the hollow body, such that the position sensor can detect a position and/or a change in the position of the sample. The position sensor is connected signal-wise to a control device, with the control device including regulating means which control the electromagnet with the aid of a signal of the position sensor such that the magnetic sample is held in a pre-settable position, preferably in its zero position, against the working pressure of the flowing fluid. The control device can include an evaluation unit which, with the aid of the electrical energy required for the excitation of the electromagnet, in particular of the electrical current or of the voltage, determines, and emits via an output unit, the flow of the fluid through the hollow body. The output unit can be connected, for example, to a display apparatus to display the flow or with a memory unit to store the flow data. To determine the flow of the fluid, the control device can include a one-dimensional, or a multi-dimensional, look-up table which suitably links the associated value of the controlled variable, that is for example the electrical current through the magnet, with further data. Such a look-up table can be represented by a two-dimensional, or multi-dimensional, data field which, while taking into account different parameters such as the temperature or the pressure of the fluid and/or of different characteristic parameters of the fluid such as density, viscosity or other characteristic parameters such as geometric characteristic parameters of the measuring apparatus, associates the associated value of the flow of the fluid through the hollow body with each value of the current which has to be fed into the electromagnet, for example, with a given flow, to stabilize the zero position of the sample. It is also possible in specific cases to determine the flow amount without using a look-up table, for example directly from the electrical current through the magnet. The control unit can in particular also be suitable to control and/or to regulate further devices, such as a pump for the fluid, in dependence on the flow.

In accordance with the invention, the sample is designed and arranged such that the fluid can flow from the inflow to the outflow of the hollow body, that is the fluid can flow around the sample either along a surface of the sample between the sample and the hollow body or the sample has at least one bore through which the fluid can flow in the operating state. In a special embodiment of the measuring device, the fluid can also flow from the inflow to the outflow of the hollow body via an overflow line. The magnetic sample can have a jacket for protection against chemically and/or physically aggressive fluids such as acids or lyes, or mechanically aggressive polishing liquids in that it is cast, for example, in a resistant material or is accommodated in a protective sleeve in which the sample is arranged in a correspondingly freely movable manner.

If the sample has a bore through which fluid flows in the operating state, the outer shape of the sample can be designed such that the sample cooperates in an axially freely movable manner and in a shape matched manner with the interior of the hollow body. The hollow body thus preferably has a circular flow cross-section, with the sample being designed in a plate shape or in cylindrical shape with a circular cross-section. Every other shape-matched embodiment of hollow body and sample is also feasible, provided that the sample remains axially movable. The sample does not need to cooperate in a shape matched manner with the interior space of the hollow body, but can have any outer shape which ensures a sufficient axial freedom of movement. The sample can in particular, for example at the bore, also have an orifice which can be replaceable so that the measuring apparatus can be matched to the respective fluid and/or a preferred measuring range for the flow amount of the fluid. The viscosity dependence of the working pressure on the sample can in particular be minimized by the suitable use of an orifice with a given flow, so that changes in the viscosity of the fluid to be measured only insignificantly influence the result of the flow measurement during a measuring process.

If the sample has no bore through which the fluid can flow from the inflow to the outflow of the hollow body in the operating state, the sample is designed and arranged in the hollow body such that the fluid can flow around the sample, at least when the sample is located in its zero position. The sample can thus have cut-outs, for example, at its outer edge which form a passage for the fluid along the body axis such that the fluid can flow from the inflow to the outflow between the sample and the inner wall of the hollow body. The inner wall of the hollow cylinder can also have corresponding cut-outs through which the fluid can flow around the sample. In certain cases, if technical flow requirements make it necessary, for example, any combination of the aforesaid embodiments can also be realized in order to allow the fluid to flow through and/or flow past the sample. Generally, both the cross-section of the hollow body and the shape of the sample can have any desired design if the axial freedom of movement of the sample in the magnetic field of the electromagnet is ensured.

The samples can thus, for example, have a cigar shape, with the maximum diameter being selected such that the sample still has a certain radial freedom of movement. This can, for example, be of advantage if liquids flow through the hollow body which are prone to easy clumping in narrow intermediate spaces or, for example with mechanically aggressive polishing liquids which can result in corresponding damage to the measuring apparatus during flowing in narrow intermediate spaces between the sample and the hollow body. Biological fluids, such as blood, can in particular be prone to forming their own surfaces of a certain thickness at surfaces which are flowed about, for which space must correspondingly be available.

If the sample still has a certain radial freedom of movement, the measuring device can include securing means for stabilization, in particular of the radial position of the sample. The sample can thus, for example, be fixed with suitable threads to the inner wall of the hollow body or be suspended at bending beams which have a high transversal flexibility and thereby ensure a sufficiently high axial movability of the sample. Or, for example, a bead can be provided which has a spring effect which is as constant as possible in the flow direction. Different securing means are also possible. For example, the sample can also be stabilized and/or fixed magnetically or in another manner, in particular radially.

In particular when large flow rates of the fluid through the hollow body have to be realized, the hollow body can include a separate overflow line for the fluid which connects the inflow of the hollow body to the outflow of the hollow body, with the overflow line having a narrowing at which the fluid causes a pressure differential in a manner known per se with which the sample is acted upon. Since, in this arrangement, the fluid can flow through the overflow line from the inflow to the outflow of the hollow body, the sample can be designed in such a shape matched manner and be axially movable arranged in the hollow body such that the fluid can neither flow around nor flow through the hollow body. However, the sample can also be designed and arranged with this embodiment such that, as described above, the fluid can flow around the sample and/or through a bore.

Generally, with the measuring apparatus in accordance with the invention, the orientation of the direction in which the sample is movably arranged can adopt any desired angle with respect to the direction of gravity. However, if—in addition to the magnetic force of the electromagnet and to the force the sample is subjected to by being acted upon with the working pressure—yet another gravitational component acts on the sample, this must likewise be taken into account to determine the correct flow of the fluid. However, by a suitable selection of the mean density of the sample, its weight can be set opposite and equal to the buoyancies in the fluid, so that the measuring apparatus can be operated independently of the direction of movement of the sample with respect to gravity and the weight of the sample no longer needs to be taken into account to determine the flow of the fluid.

In accordance with the invention, the measuring apparatus includes a control device for the electromagnet which is connected signal-wise to at least one position sensor to determine the position of the sample and wherein the control device includes regulating means which control the electromagnet with the aid of a signal of the position sensor such that the magnetic sample is held in a position, preferably in the zero position, against the working pressure, with the position sensor preferably being arranged at the outside of the hollow body or in the wall of the hollow body, such that the position sensor can detect a position and/or a change in the position of the sample, The position sensor can also be suitably arranged inside the hollow body. A magnetic field sensor, in particular a Hall probe, a differential field sensor, for example a GMR sensor (giant magnetoresistive sensor) or an LVDT (linear variable differential transformer) or an eddy current sensor can preferably be used as the position sensor. It is also possible to determine the position of the sample in another manner, e.g. by means of a light barrier with optical means or in another way.

At least two position sensors are preferably used in each case to determine the position of the magnetic sample. The position sensors are connected in the manner of a bridge circuit with the control unit and provide, in the event of a deflection of the sample from a pre-settable position, a differential signal to the control unit whose strength and sign is dependent on the magnitude and on the direction of the deflection. Two, preferably four, position sensors can in particular be arranged, for example, oppositely disposed at the hollow body such that the strength of the differential signal only depends on the axial displacement, whereas a radial displacement is not taken into account.

In this connection, the sample can additionally have one or more position transducers which cooperate with the position sensor to determine the position of the sample. The sensitivity of the measuring apparatus can be increased and a decoupling of the position sensor from the magnetic samples can be achieved by the use of position transducers in the sample. Depending on the kind of position sensors used, the position transducer can include permanently magnetic components, ferromagnetic components, electrically conductive components, optical components or other components.

If the sample is acted upon with a working pressure by fluid flowing through the hollow body, the sample is subjected to a force due to the pressure differential acting on it which deflects it substantially in the axial direction, with the force which acts on the sample depending on and increasing with the flow of the fluid through the hollow body is. The energy supplied to the electromagnetic is regulated in dependence on the signal provided by the position sensor to the control unit such that the force which the magnetic field of the electromagnet exerts on the sample is just so large enough that the sample remains in a pre-settable position, preferably in its zero position, with the electric current which flows through the electromagnet being used as the preferred control variable to regulate the electromagnet. Different electrical operating parameters, such as the electrical voltage, can also be used as control variables.

In a preferred embodiment of the measuring apparatus in accordance with the invention, the regulating means include a PI controller (proportional plus integral controller) known per se, a known PID controller (proportional plus integral plus derivative controller) or a state controller and an electrical source of power to supply the electromagnet with electric power.

The control device can furthermore include an evaluation device which determines the flow of the fluid through the hollow body with the aid of the electrical energy required for the excitation of the electromagnetic, in particular the electrical current, and emits it via an evaluation unit. The evaluation unit can be connected, for example, to a display unit to display the flow or to a memory unit to store the flow data and, in special cases, cooperate with other regulating devices.

As a rule, the flow of the fluid through the hollow body is not in a simple relationship with the working pressure caused on the sample by the flowing fluid. The same thus applies to the relationship between the control variable, that is e.g. the electrical current through the electromagnet and the flow of the fluid. In special cases, the current with which the electromagnet has to be fed to stabilize the zero position of the sample is square to the flow of the fluid through the hollow body. This simple relationship is, however, frequently not realized in practice and be characteristically different depending on the kind of the liquid. Different characteristic values of the liquid such as the viscosity, the density or parameters such as the temperature of the fluid or geometrical factors can in particular also have a sensitive influence on the relationship between the control variable and the flow of the fluid.

To determine the flow, the associated value of the control variable, that is for example, the electric current through the magnet, must therefore be suitably linked with data which are made available in a data store, for example in the form of a so-called look-up table. Such a look-up table can be represented by a two-dimensional or a four-dimensional data field which, while taking into account different parameters such as temperature or pressure of the fluid and/or different characteristic values of the fluid such as density, viscosity or other characteristic values, for example geometrical factors, associates the associated value of the flow of the fluid through the hollow body with each value of the current which has to be fed into the electromagnet with a given flow to stabilize the zero position of the sample.

In a further embodiment of the measuring apparatus in accordance with the invention, the flow cross-section of the hollow body varies along the longitudinal axis and/or the cross-sectional area of the sample varies along the body axis in accordance with a pre-settable scheme. In a preferred variant, the flow cross-section of the hollow body expands conically, starting from the inflow in the direction of the outflow, from a first flow cross-section to a second flow cross-section and/or the flow cross-section of the hollow body narrows conically, starting from the inflow in the direction of the outflow, from a third flow cross-section to a fourth flow cross-section. The side of the sample facing the inflow expands correspondingly from a first diameter of a cross-sectional area of the sample to a second diameter of a cross-sectional area of the sample and/or a cross-sectional area of the sample narrows on a side of the sample facing the outflow such that the sample cooperates with the hollow body such that the flow depends on the spacing of the sample from the inflow or from the outflow respectively.

It is thus in particular possible to optimize the resolution of the measuring apparatus for special demands or to match it to special measuring regions for the flow. The pressure drop over the sample can thus, for example, be kept constant by setting a fixed value of the electrical current which feeds the electromagnet such that the flow of the fluid can be determined from the position of the sample, with the position of the zero position being able to be adapted individually for each measurement by the control device depending on the requirement, such that, for example, the gradient of a characteristic line which links the flow of the fluid with the associated current through the electromagnet is varied, whereby the measuring sensitivity can be changed. This means that, by a suitable choice of the zero position, one and the same measuring device can be configured for different measuring ranges of the flow and can even be adapted during the operation of the measuring range.

The sample is in particular designed such that the sample cooperates with the hollow body such that, by a suitable positioning of the sample, the flow of the fluid through the hollow body is completely prevented. The sample and/or the hollow body preferably has, as already described, a cut-out which forms a passage for the fluid along the body axis so that, in dependence on the position of the sample, the fluid can flow or not flow between the sample and the inner wall of the hollow body from the inflow to the outflow. To satisfy the same function, the sample can also have one or more bores. With this variant, the flow of the fluid through the hollow body can be determined as described above, on the one hand; the flow of the fluid can also be regulated, on the other hand, in that a force is exerted on the magnetic sample by the electromagnet such that the sample is brought into a pre-settable position and is held there.

In a preferred embodiment, the control apparatus includes a valve regulator which compares a pre-settable desired value for the flow of the fluid with an actual value determined from the control variable, for example from the magnitude of the electrical current through the electromagnet, so that the control unit controls the electromagnet such that the pre-set desired value is regulated To determine and regulate the flow of the fluid, a look-up table is preferably used which, as already stated, can be represented by a two-dimensional or a three-dimensional data field which while taking into account different parameters such as the temperature or the pressure of the fluid and/or different characteristic values of the fluid such as density, viscosity or other characteristic values, associates a value of the electrical current to a flow of the fluid through the hollow body, said current having to be fed into the electromagnet for the corresponding positioning of the sample. It is also possible with the aid of the look-up table to associate the associated flow of the fluid to a predetermined value of the electrical current and possibly to control and/or to regulate further devices such as a pump for the fluid in dependence on the flow.

Furthermore, the measuring apparatus can also be used to determine a characteristic value of the fluid, in particular the viscosity and/or the density. For this purpose, the sample is preferably held by the magnetic force of the electromagnet at a pre-settable position, for example in the zero position or at another position, with a constant flow. If, with a constant flow of the fluid, a characteristic value of the fluid, for example the viscosity, the density or another characteristic value changes in dependence on the time, generally the value of the electrical current which flows through the electromagnetic must be adapted correspondingly if the sample should maintain the pre-determined position in the hollow body. Analogously to the previously described method, when a corresponding look-up table is used with the given flow, the corresponding characteristic value and/or its change can be determined from the value and/or from the change of the electrical current through the electromagnet.

Since the measuring precision of the measuring apparatus also depends, among other things, on the flow of the fluid, a measuring apparatus with an adjustable measuring precision is available with the previously described embodiment. The measuring precision of the measuring apparatus can, for example, be increased in that the sample is held at a pre-settable position which corresponds to a higher flow. As a rule, the measuring precision falls correspondingly when the flow is reduced. The position of the sample can preferably be set such that, at a maximally tolerable pressure drop over the sample, an optimum resolution is achieved. The current through the electromagnet can in particular be set for a given measuring range of the flow, for example, to a constant value so that, with a changing flow, the pressure differential over the sample remains substantially constant and the flow of the fluid and/or the change of the flow can be determined from the position and/or from the change in the position of the sample.

The method in accordance with the invention to determine the flow of a fluid is carried out by means of a measuring apparatus which includes a hollow body which has an inflow and an outflow for the fluid and in which hollow body a magnetic sample is movably arranged. The measuring apparatus further includes an electromagnet to exert a magnetic force on the magnetic sample as well as a control unit for the electromagnet which is connected signal-wise to at least one position sensor to determine the position of the magnetic sample. With the method in accordance with the invention, the fluid flows through the hollow body from the inflow to the outflow such that the sample is acted upon by a working pressure. The electromagnet is controlled with the aid of a signal of the positional sensor such that the magnetic sample is held in a position against the working pressure.

Furthermore, the measuring apparatus is used in accordance with the invention to determine a characteristic value of a fluid, in particular the viscosity and/or the density and is used as a valve and/or as a flow regulating system for a fluid.

The invention will be described in more detail in the following with reference to the drawing.

BRIEF DESCRIPTION OF THE DRAWINGS

FIG. 5 is a section B—B in accordance with FIG. 4 and FIG. 4a;

DESCRIPTION OF THE PREFERRED EMBODIMENTS

Figure 1:
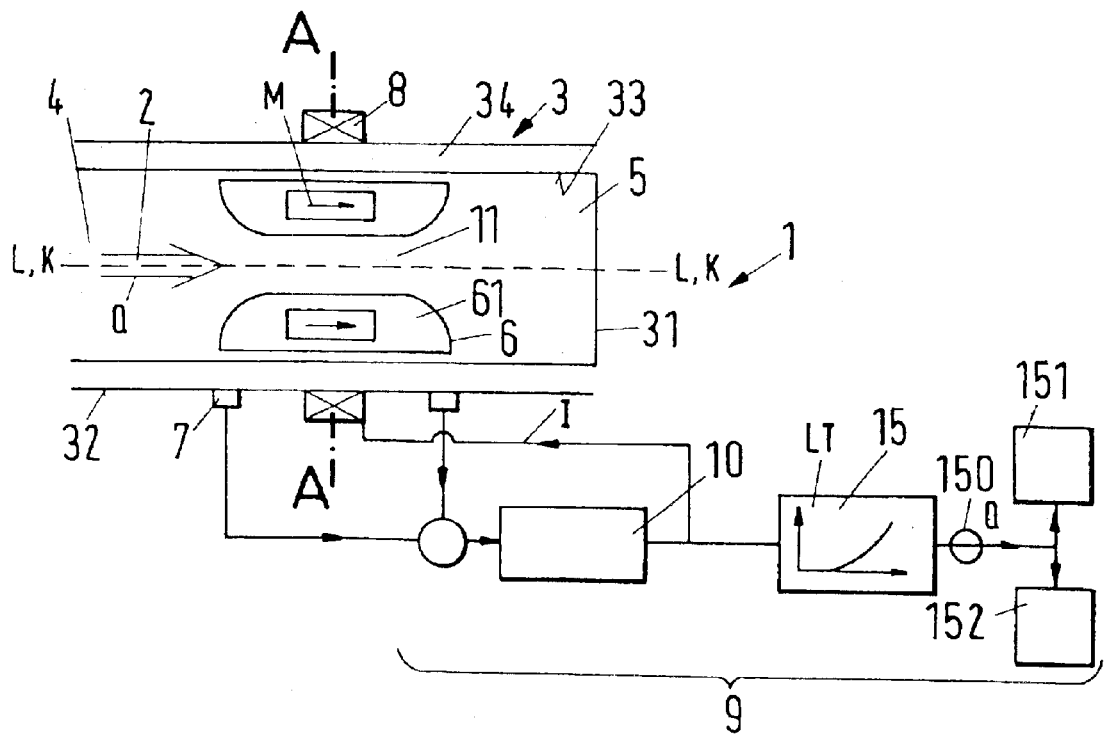
FIG. 1 shows an embodiment of a measuring apparatus in accordance with the invention with a control unit.

FIG. 1 shows in a schematic representation a measuring apparatus in accordance with the invention to determine the flow of a fluid, which measuring apparatus is designated in the following overall with the reference numeral 1.

The measuring apparatus 1 shown in FIG. 1 includes a hollow body 3 which has a circular flow cross-section 31 and is designed in the form of a cylindrical pipe. As indicated by the double arrow, a fluid 2 flows through the hollow body 3, with the flow of the fluid 2 per time unit being designated by the reference symbol Q. A preferably plate-shaped magnetic sample 6 is arranged inside the hollow body 3 such that its body axis K is movable in the axial direction along a longitudinal axis L of the hollow body 3, with the sample 6 being acted upon by the flowing fluid 2 with a working pressure which exerts a force on the magnetic sample 6 in the direction of the flowing fluid 2. The magnetic sample 6 can, for example, include a plate-shaped or a ring-shaped permanent magnet which is polarized in the direction of the body axis K which stands perpendicular on the ring plate and points in the direction of the of the longitudinal axis L of the hollow cylinder 3. The sample 6 can also include, for example, a bar magnet polarized in the direction of the body axis K or a differently formed magnet, with the magnetic sample 6 also being able to include, for example, a ferromagnetic material F such as iron, which is in particular of advantage if the fluid 2 is exposed to larger temperature fluctuations.

The hollow body 3 further includes an electromagnet 8 which is suitable to exert a magnetic force on the sample 6 in substantially the axial direction. The electromagnet 8 includes a coil which is arranged in a manner known per se in the peripheral direction on the outer wall 32 of the hollow body 3. On the excitation of the electromagnet 8 by an electrical current I, the electromagnet 8 can enter into cooperation with the magnetic sample 6 and exert a Lorentz force $\vec{F} = \vec{B} \times \vec{I}$ on this, where, as customary, $\vec{B}$ designates the magnetic flux density and $\vec{I}$ designates the electric current through the coil of the electromagnet, with the magnetic sample 3, in the embodiment shown in FIG. 1, being arranged symmetrically in the axial direction in operation in the zero position with respect to the field line profile of the electromagnet 8 and being oriented such that the sample 6 always undergoes a restoring force in the direction of the zero position with respect to an axial deflection, with the Lorentz force disappearing in the precise zero position. This means that the zero position of the sample 6 is here a stable position of equilibrium with respect to an axial deflection, with—as already mentioned—the zero position having to be understood in the context of this application as that position X in the hollow body 3 which the sample 6 adopts under the effect of a magnetic force of the electromagnet 8 when the flow speed of the fluid 2 through the hollow body 3 disappears, that is when the flow of the fluid 2 through the hollow body 3 is zero. The zero position can also be freely pre-set by a corresponding control of the electromagnet 8 and can be changed depending on the demands in operation.

The position X of the sample 6 in the hollow body 3 can be determined by the two position sensors 7 which are arranged on the outer wall 32 of the hollow body 3 such that they can detect a position X and/or a change in the position X of the sample. The position sensors 7 are connected signal-wise to a control device 9, with the control device 9 including regulating means 10 which control the electromagnet 8 with the aid of a signal of the position sensors 7 such that the magnetic sample 6 is held in a pre-settable position X, preferably in its zero position, against the working pressure of the flowing fluid 2. The control device 9 includes an evaluation unit 15 which determines the flow Q of the fluid through the hollow body 3 with the aid of the electrical current I required for the excitation of the electromagnet 8 and emits this via an output unit 150. The output unit 150 is connected to a display unit 151 to display the flow Q and to a memory unit 152 to store the flow data.

The magnetic sample 6 has a jacket 61 for protection against chemically and/or physically aggressive fluids 2 such as acids or lyes, or against mechanically aggressive polish liquids.

The sample 3 furthermore has a bore 11 through which fluid 2 flows in the operating state, with the outer shape of the sample 6 being designed in the preferred embodiment shown here such that the sample 6 cooperates in an axially freely movable and shape matched manner with an interior surface 33 of the hollow body 3. The hollow body 3 preferably has a circular flow cross-section 31, with the sample 6 being designed with a plate shape or a cylinder shape with a circular cross-section. Any other shape-matched embodiment of the hollow body 3 and of the sample 6 is also possible, provided that the sample 6 remains axially movable. The sample 6 does not need to cooperate in a shape matched manner with the interior space of the hollow body 3, but can have any outer design which ensures axial freedom of movement.

FIGS. 1a to 1e show further embodiments of the measuring apparatus in accordance with FIG. 1.

Figure 1A:
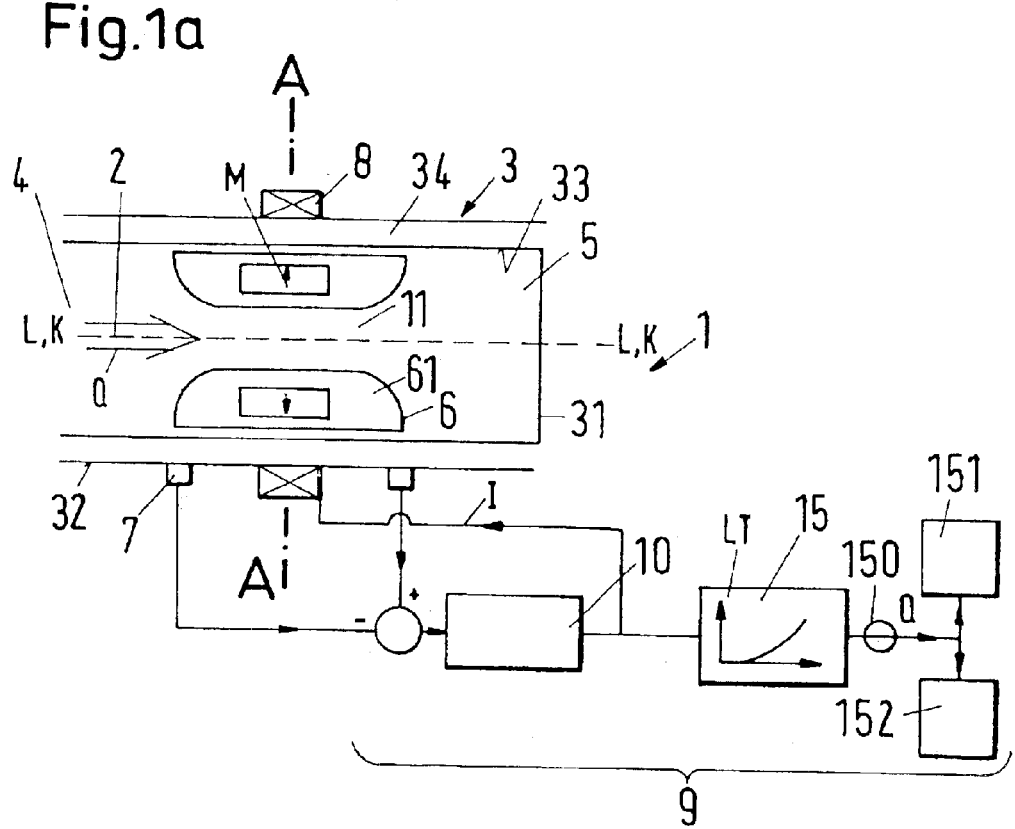
FIG. 1a shows a second embodiment in accordance with FIG. 1 with a radially magnetized sample.

A second embodiment in accordance with FIG. 1 is shown in FIG. 1a, in which the plate-shaped or ring-shaped permanent magnet is polarized in the radial direction. In this embodiment, the zero position can be freely pre-set by a corresponding control of the electromagnet 8 and be changed depending on the demands in operation.

The magnetic sample 6 can also be oscillated about is axial position X with the help of the electromagnet 8 to determine the viscosity $\eta$ of the fluid 2. With a given frequency and amplitude of the current I, the resulting movement of the sample 6 (amplitude and phase position with respect to the excitation) is then a measure for the viscosity $\eta$. This means that, when the electrical excitation values and the mechanical response of the sample 6 are known, the viscosity can be determined. Any other value, such as the amplitude of the movement, can also be pre-set and the amplitude of the current I and/or of the regulating voltage is then a measure for the viscosity $\eta$. The viscosity $\eta$, which can be determined in this manner, can then be used in a further step to calibrate the current I/flow Q relationship.

Figure 1B:
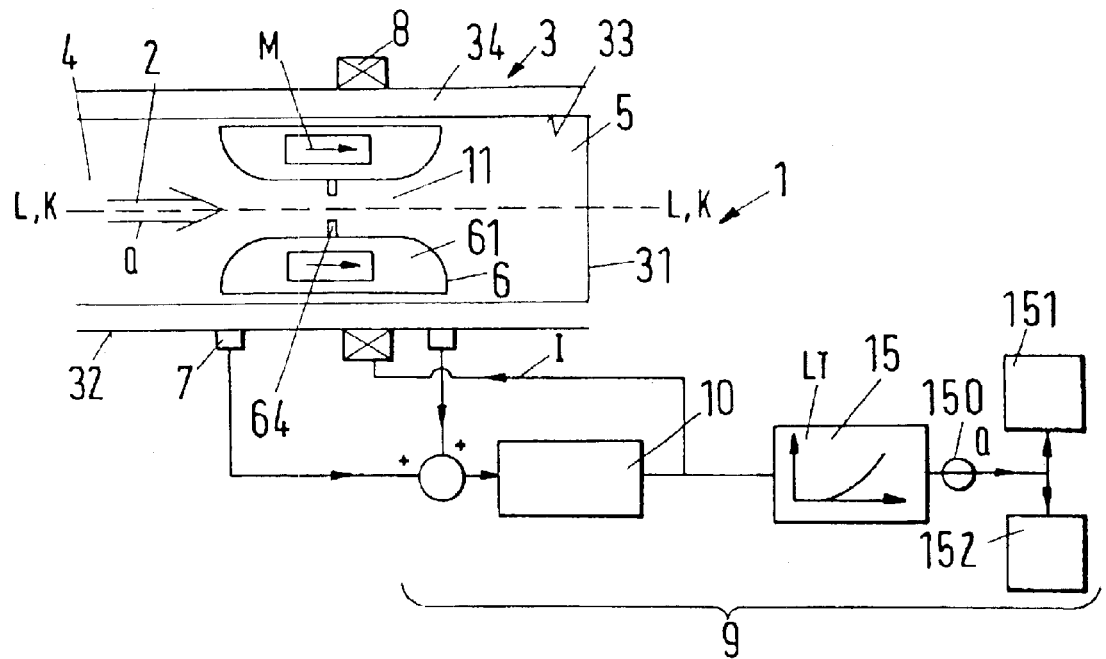
FIG. 1b shows a third embodiment in accordance with FIG. 1 with an orifice arranged in a bore.

In FIG. 1b, the magnetic sample 6 in the bore 11 additionally has an orifice 64 with which a pressure drop over the sample 6 can be pre-set by a suitable choice of the opening cross-section of the orifice 64. The orifice 64 can also be positioned at another point in or on the bore 11 and the magnetic body 6 can also be radially magnetized or, as will be explained later, can be magnetized in the axially opposite direction in the direction of the longitudinal axis L and can include ferromagnetic regions F to bundle the magnetic flow.

Figure 1C:
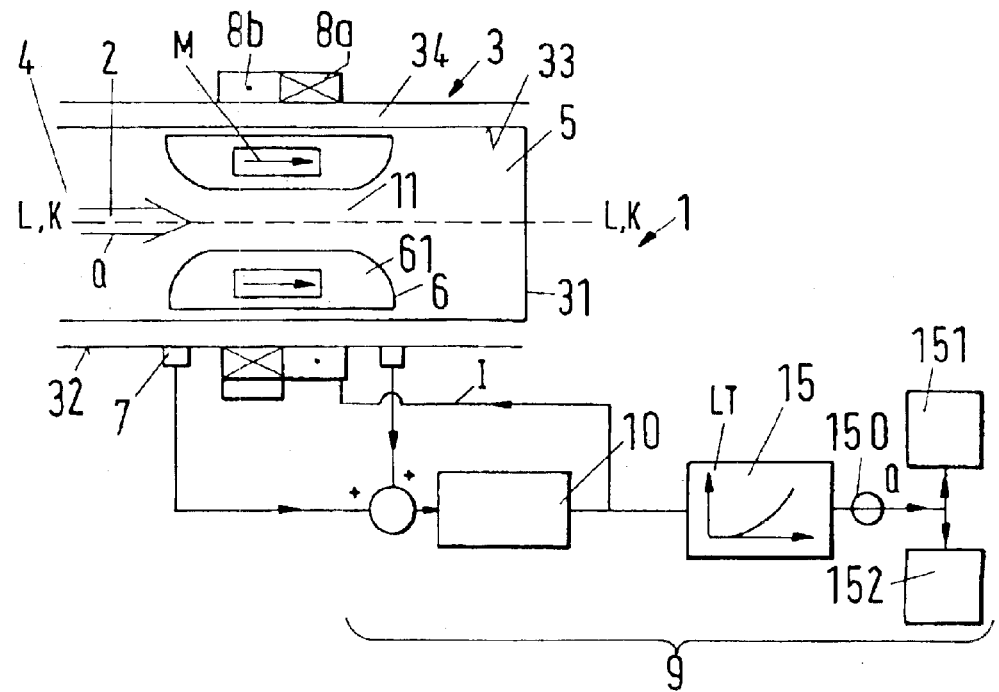
FIG. 1c shows a fourth embodiment in accordance with FIG. 1 with an electromagnetic including two coils.

As shown in FIG. 1c, the measuring apparatus 1 can also include two or more electromagnets 8 or the electromagnetic 8 can include more than one coil, for example two coils 8a and 8b, with the sense of winding and/or the current I through the coils 8a and 8b being oriented in the same direction or in opposite directions, as shown in FIG. 1c. It is understood that all the embodiments of a measuring apparatus 1 in accordance with the invention described in this application can be correspondingly equipped with a plurality of magnetic coils.

Figure 1D:
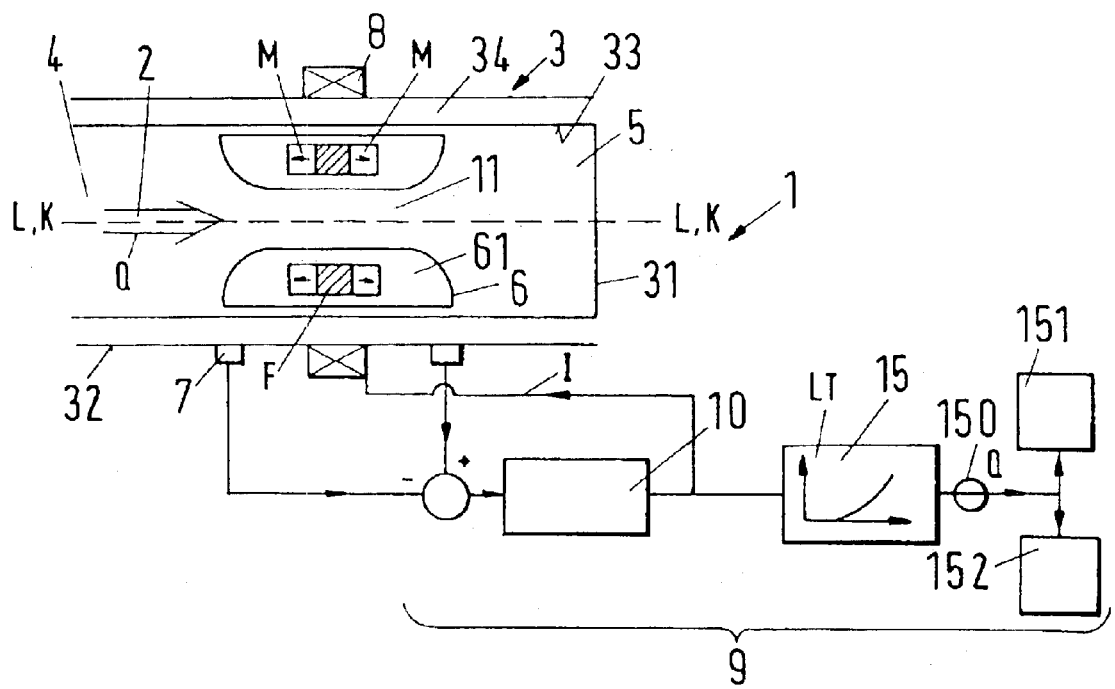
FIG. 1d shows a fifth embodiment in accordance with FIG. 1 with ferromagnetic flow bundling in the sample.
Figure 1E:
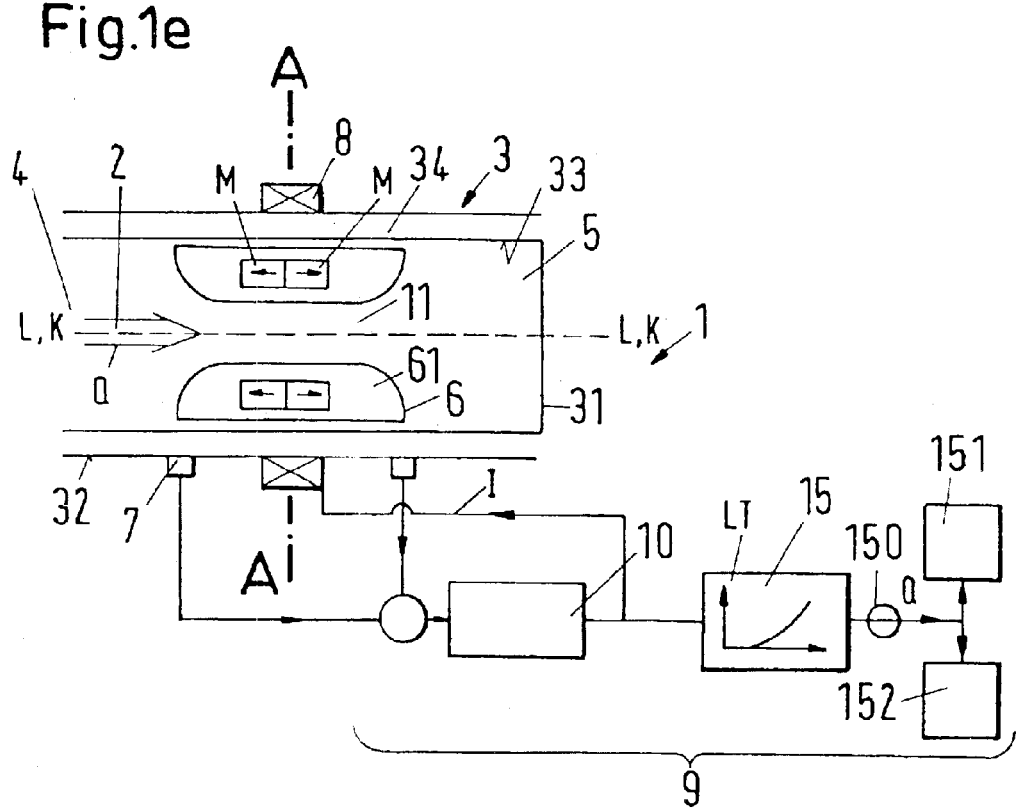
FIG. 1e shows a sixth embodiment in accordance with FIG. 1 with a sample magnetized in axially opposite directions.

In FIG. 1d and FIG. 1e, a respective embodiment is shown of a sample 6 magnetized in the direction of the longitudinal axis L in the axially opposite direction, with the sample 6 additionally including a ferromagnetic region F to bundle the magnetic flow or to lead it into a desired direction.

Since the measuring apparatus 1 in accordance with the invention is in particular also suitable to measure the flow of aggressive fluids 2 or to measure the flow of highly pure fluids 2, it is advantageous—as already mentioned—for the magnetic sample 6 to have a jacket 61 as shown in FIG. 1.

Figure 2:
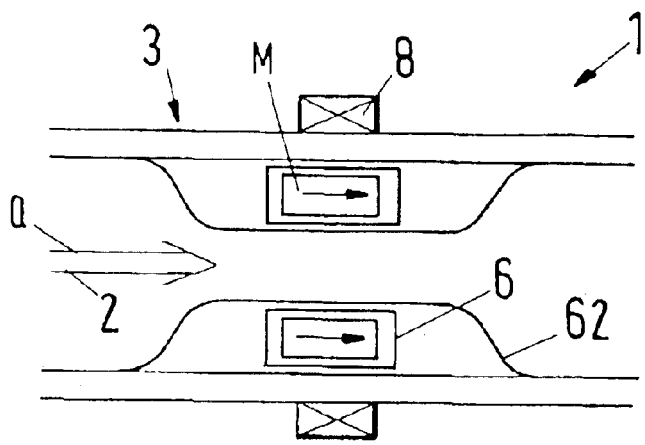
FIG. 2 shows a magnetic sample arranged under a flexible protective cover.

Alternatively, the magnetic sample can, however, also be arranged, as shown in FIG. 2, in a protective cover 62, which is preferably, but not necessarily flexible and which insulates the sample 6 from the fluid 2 without restricting its axial freedom of movement, with the protective cover 62, which is also termed a bead, also being suited to ensure the radial positioning of the sample 6.

Figure 2A:
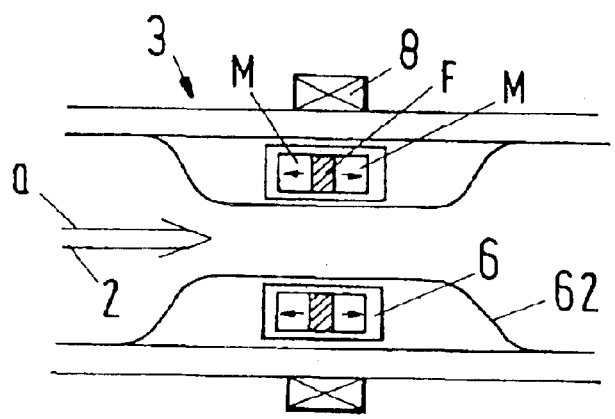
FIG. 2a shows a second embodiment in accordance with FIG. 2 with a sample magnetized in axially opposite directions and with flow bundling.

In FIG. 2a, a second embodiment in accordance with FIG. 2 is shown in which the sample 6 is magnetized in the axially opposite direction and includes a ferromagnetic region F to redirect the magnetic flow. The ferromagnetic region F can also be omitted here or the sample 6 can be radially magnetized.

Figure 3:
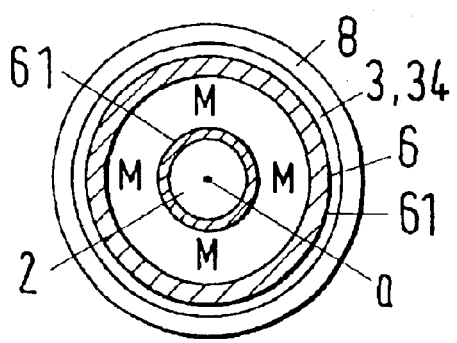
FIG. 3 is a section A—A in accordance with FIG. 1.

FIG. 3 shows a section A—A in accordance with FIG. 1. The electromagnet 8 surrounds the hollow cylinder 3 in the form of a circular ring. The plate-shaped or cylindrical sample 6 includes a jacket 61 in which the plate-shaped or ring-shaped permanent magnet, which bears a magnetization M, is embedded in a manner insulated from the flowing fluid 2.

Figure 4:
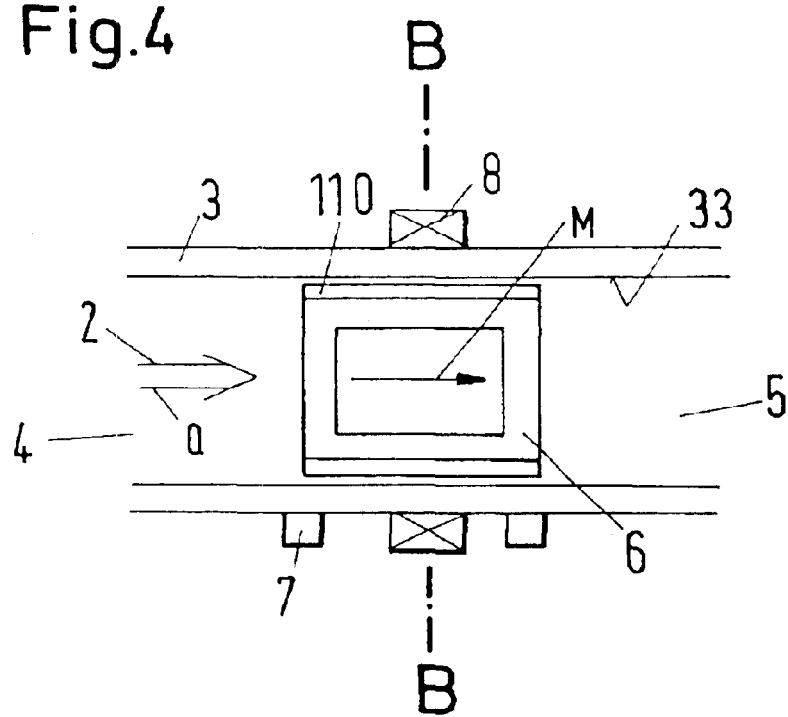
FIG. 4 shows an embodiment of a magnetic sample which has no throughbore.

In FIG. 4, an embodiment of a magnetic sample 6 is shown which has no bore 11 through which the fluid 2 can flow in the operating state from the inflow 4 to the outflow 5 of the hollow body 3. The sample 6 is rather designed and arranged in the hollow body 3 such that the fluid 2 can flow about the sample 6. For this purpose, the sample 6 has cut-outs 110 at is outer edge which form a passage for the fluid 2 such that the fluid can flow between the sample 6 and the inner wall 33 of the hollow body 3 from the inflow 4 to the outflow 5.

Figure 4A:
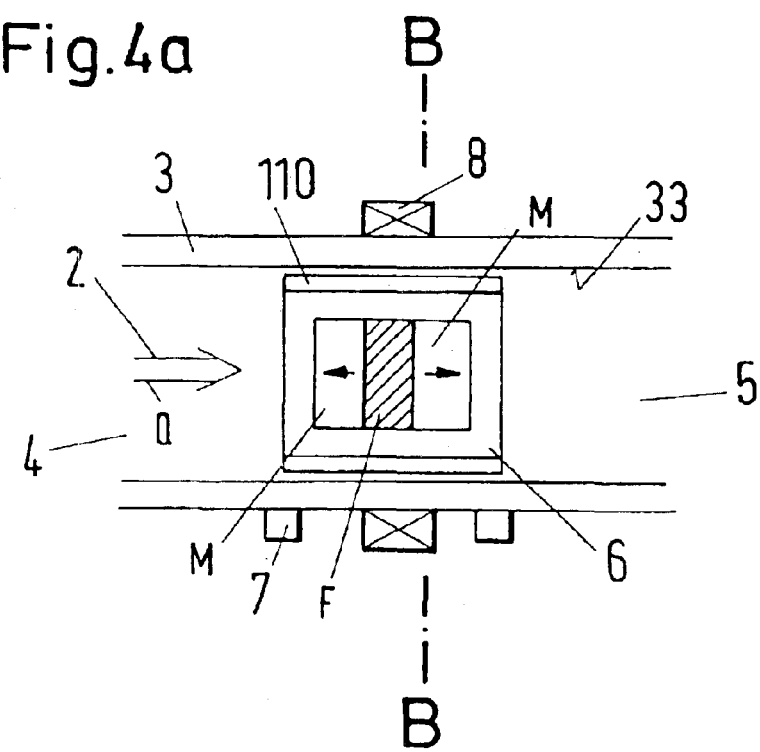
FIG. 4a shows a second embodiment in accordance with FIG. 4 with a sample magnetized in axially opposite directions and with flow bundling.

In FIG. 4a, a second embodiment in accordance with FIG. 4 is shown in which the sample 6 is magnetized in the axially opposite direction and includes a ferromagnetic region F to redirect the magnetic flow. The ferromagnetic region F can also be omitted here or the sample 6 can be radially magnetized.

Figure 5:
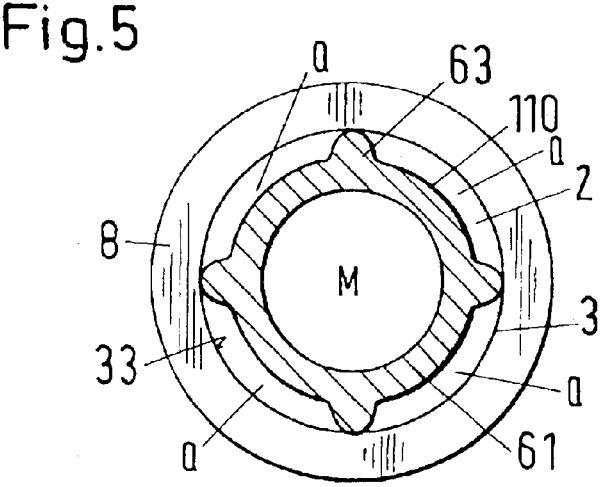

FIG. 5 shows, in accordance with FIG. 4 and FIG. 4a, a section through the hollow body 3 with the sample 6 along the sectional line B—B, with the sample 6 preferably being surrounded by a jacket 61 which includes the recesses 110. Webs 63 are arranged between two respective recesses 110 and are designed and arranged such that the sample 6 is movably guided through the webs 63 in the axial direction and its position is stabilized in the radial direction.

Figure 6:
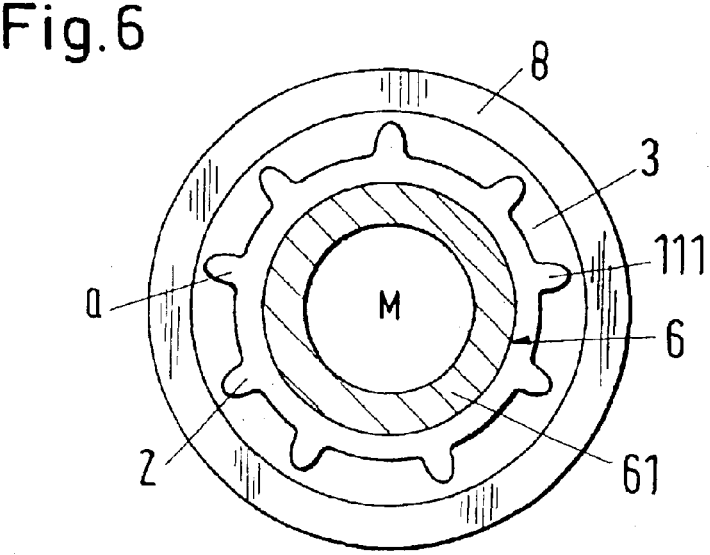
FIG. 6 is a representation of a hollow body in section with guide passages for the fluid.

It is also possible for, as shown in FIG. 6 for the example of a hollow body 3 in section, the hollow body 3 to have one or more guide passages 111 through which the fluid 2 can flow past the sample 6 from the inflow 4 to the outflow 5. The sample 6 is then preferably designed in the form of a cylinder or in the form of a plate with a jacket 61, with the sample 6 being designed and arranged such that it is freely guided in the axial direction and its position is stabilized in the radial direction.

In certain cases, if technical flow requirements make it necessary, for example, any combination of the aforesaid embodiments can also be realized to allow the fluid 2 to flow through and/or past the sample 6. Generally, both the cross-section of the hollow body 3 an the shape of the sample 6 can have any desired design if the axial freedom of movement of the sample 6 in the magnetic field of the electromagnet 8 is ensured.

Figure 7:
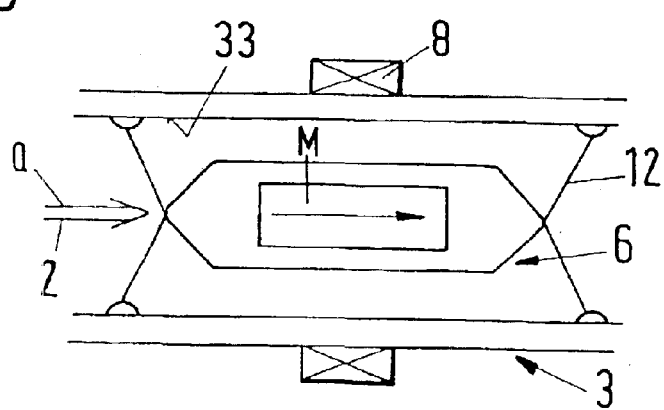
FIG. 7 shows a sample radially stabilized by securing means.
Figure 7A:
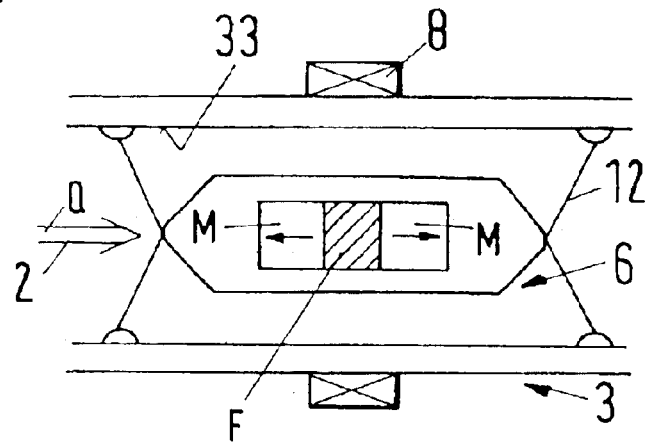
FIG. 7a shows a second embodiment in accordance with FIG. 7 with a sample magnetized in axially opposite directions and with flow bundling.

For instance, the sample 6, as shown in FIG. 7 to FIG. 9a, can, for example, be designed in cigar shape such that a certain radial freedom of movement is still available to it. This can be of advantage, for example, if the hollow body 3 is flowed through by a fluid 2 which is prone to easy clumping in narrow intermediate spaces or, for example, with mechanically aggressive polish liquids, which can result in corresponding damage on flowing in narrow intermediate spaces. In particular biological liquids such as blood can be prone to form their own surfaces of a certain thickness at surfaces which are flowed about, for which space must correspondingly be available. If the sample 6 still has a certain radial freedom of movement, the measuring apparatus 1 can, as shown by way of example in FIG. 7 to FIG. 8*a*, include securing means 12 for stabilization, in particular of the radial position of the sample 6. The sample 6 is thus fixed in FIG. 7 and FIG. 7*a* by suitable threads 12 at the inner wall 33 of the hollow body 3 such that its position is substantially stable in the radial direction, while the sample 6 still has the required freedom of movement in the axial direction.

Figure 8:
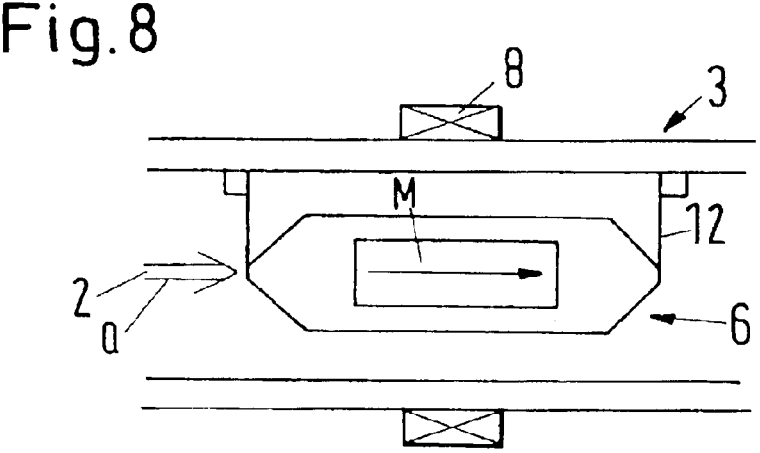
FIG. 8 shows a third embodiment in accordance with FIG. 7.
Figure 8A:
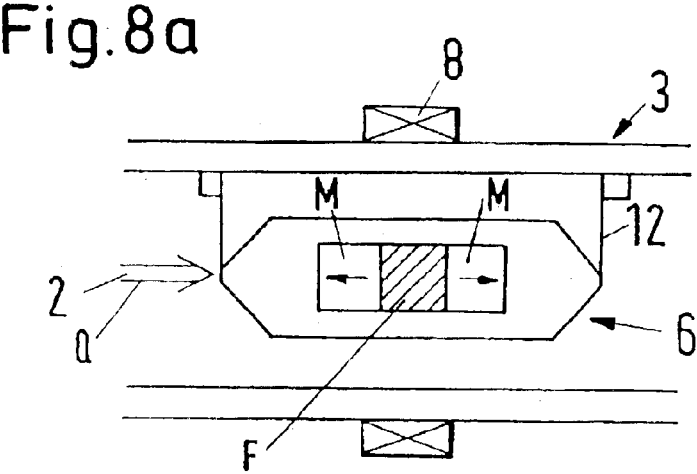
FIG. 8a shows a fourth embodiment in accordance with FIG. 8 with a sample magnetized in axially opposite directions and with flow bundling.

In the embodiment of FIG. 8 and FIG. 8*a*, the sample 6 is suspended at bending beams 12 which hold the sample 6 in a substantially stable radial position and have a high transverse flexibility and thereby ensure a sufficiently high axial movement of the sample 6.

Different securing means 12 from mechanical securing means 12 are also possible. For example, the sample 6 can, as shown by way of example in FIG. 9 and FIG. 9*a*, also be radially stabilized by magnetically acting securing means 12. For this purpose, the hollow body 3 can have one or more securing magnets 12 which, as shown for example in FIG. 9 and FIG. 9*a*, suitably surround the hollow body 3 as magnetic rings 12. It is also possible for the hollow body 3 to be made up, for example, of a ferromagnetic material F and for the sample 6 to have additional magnets as securing means 12 which radially stabilize the position of the sample 6, with the magnets 12 acting as securing means 12 preferably being designed, as shown by way of example in FIG. 9 and FIG. 9*a*, as radially or axially magnetized ring magnets, with the magnets 12, however, also being able to have any other suitable geometrical shape.

Figure 9:
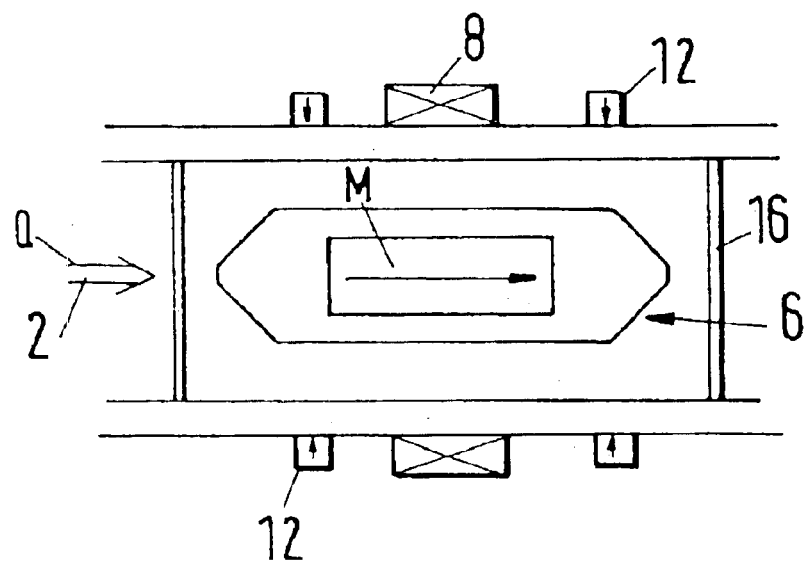
FIG. 9 shows an embodiment in accordance with FIG. 7, wherein the sample is radially stabilized by magnetic securing means.
Figure 9A:
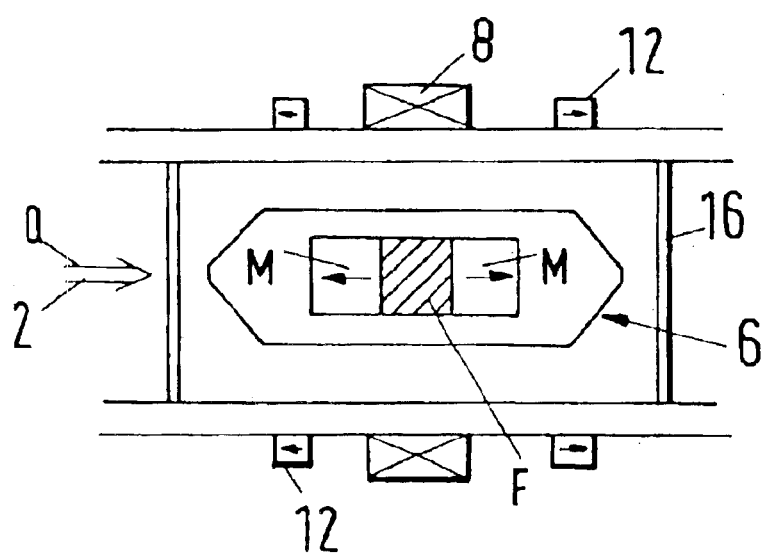
FIG. 9a shows a second embodiment in accordance with FIG. 9 with a sample magnetized in axially opposite directions and with flow bundling.

Furthermore, the hollow body 3 can, as shown in FIG. 9 and FIG. 9*a*, possibly still have one or more axial bounding elements 16 which restrict the axial deflection capability of the sample 3. This is of special advantage in the passive magnetic support as shown in FIG. 9 and FIG. 9*a*, since the passive magnetic support is axially substantially unstable and axial stabilization can only be achieved by the electromagnet 8 in the operating state. This can also be sensible when the flow Q of the fluid 2 through the hollow body 3 is subject to severe, brief pressure fluctuations. The presence of radial bounding elements 16 is not limited to embodiments in which the sample 3 is radially stabilized by magnetically acting securing means 12. The radial bounding elements 16 can also be present in other embodiments of the measuring apparatus 1 in accordance with the invention.

In particular when a relatively large flow Q of the fluid 2 through the hollow body 3 has to be realized, the hollow body 3 can include a separate overflow line 13 for the fluid 2 which connects the inflow 4 of the hollow body 3 to the outflow 5 of the hollow body 3.

Figure 10:
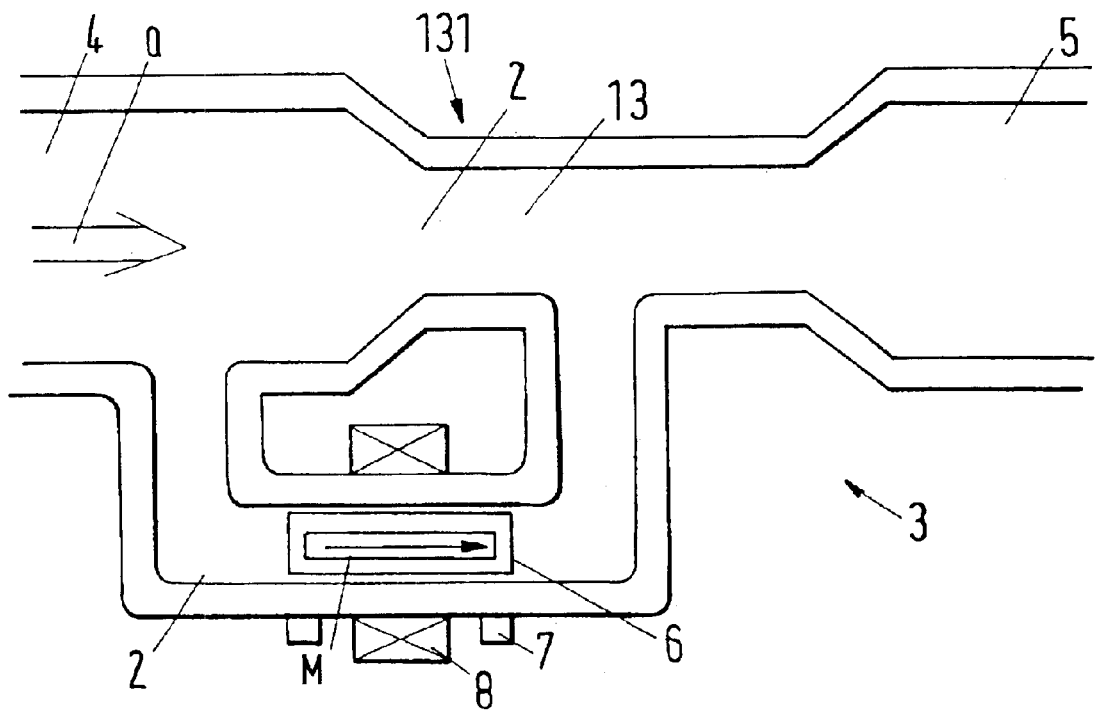
FIG. 10 shows an embodiment of a measuring apparatus with an overflow line.
Figure 10A:
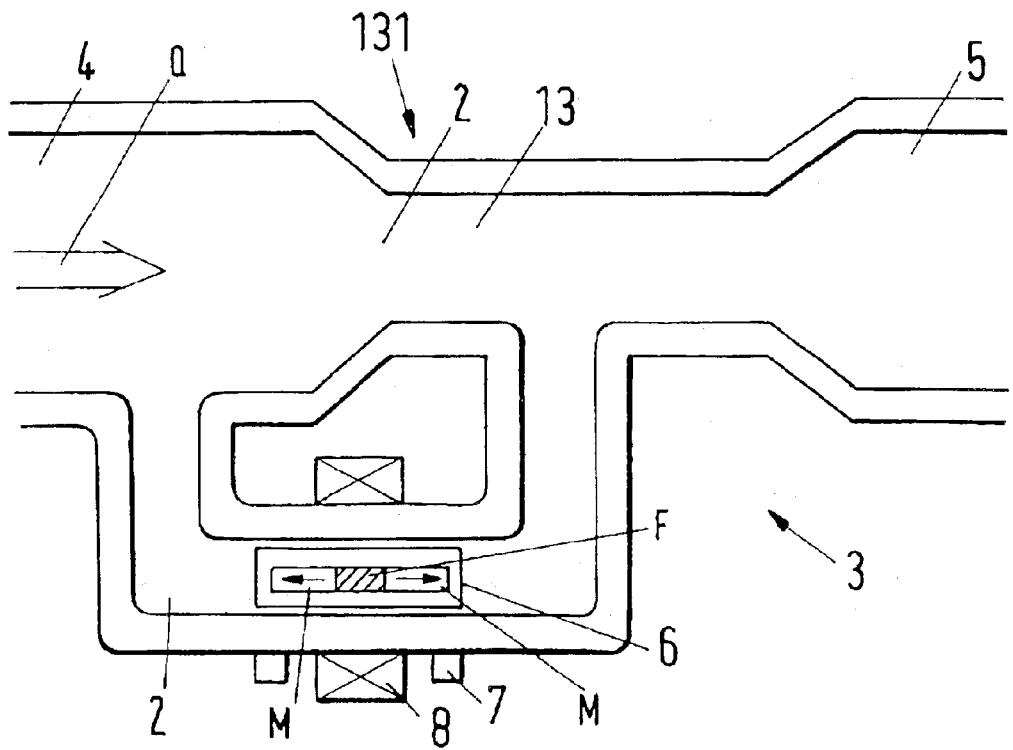
FIG. 10a shows a second embodiment in accordance with FIG. 10 with a sample magnetized in axially opposite directions and with flow bundling.

FIG. 10 and FIG. 10*a* show by way of example a respective embodiment of a measuring apparatus 1 with an overflow line 13, with the overflow line 13, which connects the inflow 4 to the outflow 5, having a narrowing 131 at which the fluid 2 causes a pressure differential 131 in a manner known per se with which the sample 6 is acted upon. Since the fluid 2 in this arrangement can flow through the overflow line 13 from the inflow 4 to the outflow 5 of the hollow body 3, the sample 6 can be designed and can cooperate in shape matched manner with the inner surface 33 of the hollow body 3 such that the sample 6 is axially movable in the hollow body 3 and the fluid can neither flow about nor flow through the hollow body 3. The sample 6 can, however, also be designed and arranged with this embodiment such that, as described above, the fluid 2 can flow about the sample 6 through cut-outs 110 and/or guide passages 111 and/or can flow through a bore 111.

In accordance with the invention, in the embodiment of FIGS. 10 and 10*a*, the measuring apparatus 1 also includes a control device 9 (not shown) for the electromagnet 8, which control device 9 is connected signal-wise to at least one position sensor 7 to determine the position X of the sample 6, with the control device 9 including regulating means 10 which control the electromagnet 8 with the help of a signal of the position sensor 7 such that the magnetic sample 6 is held in a pre-settable position X, preferably in the zero position, against the working pressure.

In this connection, the position sensor 7 is preferably arranged at the outside of the hollow body 3, such as is shown, for example, by way of example in FIG. 1, FIG. 4 and FIG. 10, or in the wall 34 of the hollow body 3, such that the position sensor 7 can detect a position X and/or a change in the position X of the sample 6. The position sensor 7 can also be suitably arranged inside the hollow body 3.

Different types of sensors can be used as position sensors 7. The position sensor 7 preferably includes a magnetic field sensor 71, in particular a Hall probe 72, a differential field sensor 73, for example on the basis of a GMR sensor 74 (giant magnetoresistive sensor), in particular a GMR sensor bridge, or an LVDT 75 (linear variable differential transformer), or an eddy current sensor 76. It is also possible to determine the position X of the sample 6 in another manner, e.g. by means of a light barrier with optical means or differently.

Figure 11:
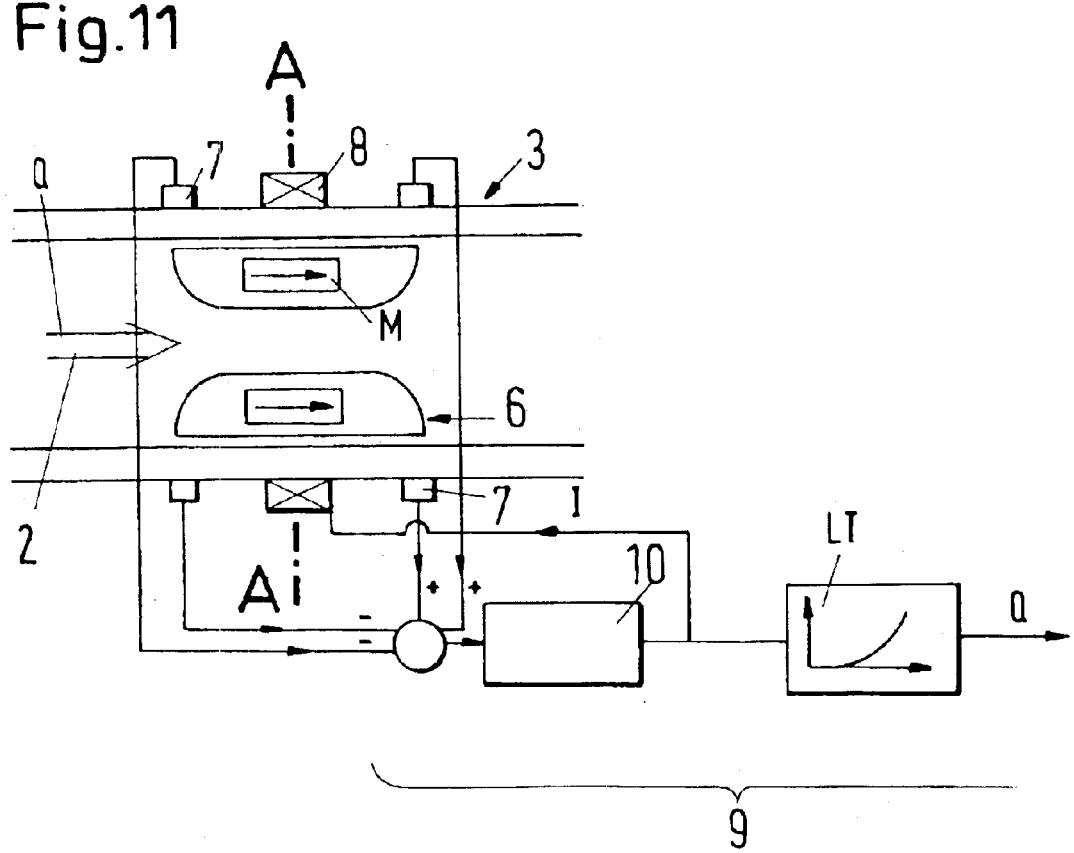
FIG. 11 shows an embodiment of a measuring apparatus with a plurality of position sensors.
Figure 11A:
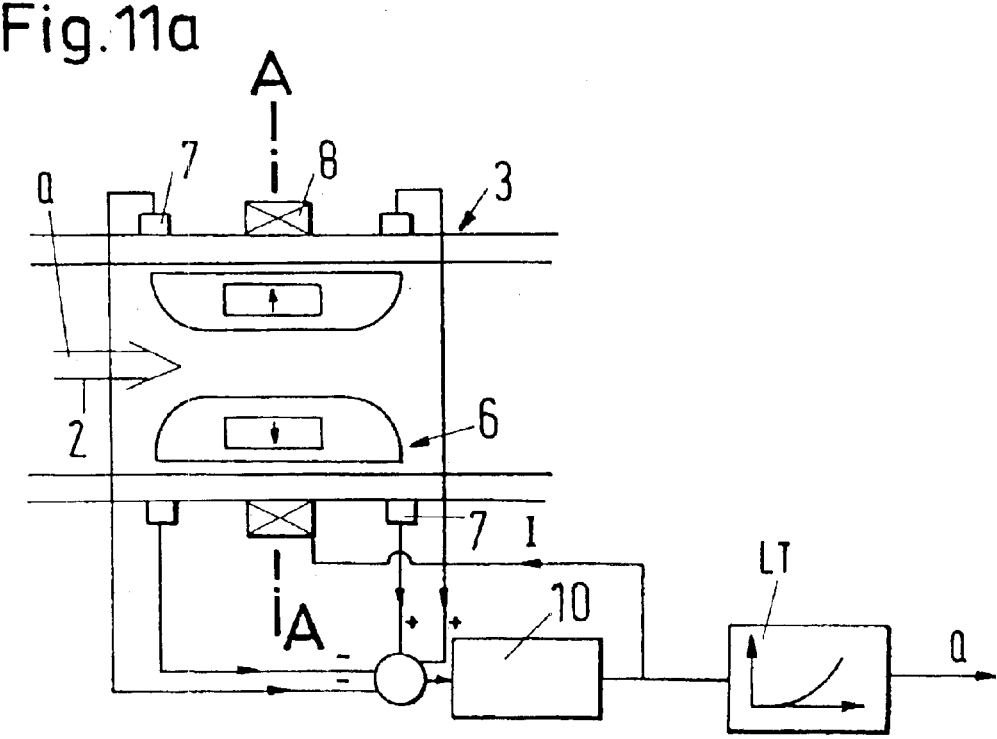
FIG. 11a shows a second embodiment in accordance with FIG. 11 with a radially magnetized sample.

At least two respective position sensors 7 are preferably used to determine the position of the magnetic sample 6 which are connected to the control device 9 in the arrangement of a bridge circuit and provide, in the event of a deflection of the sample 6 from its zero position, a differential signal to the control unit 9 whose strength and sign is dependent on the magnitude and on the direction of the deflection of the sample 6, with the position sensors 7, as shown in FIG. 1, being able to be arranged on a line parallel to the longitudinal axis L of the hollow body 3 in accordance with the representation to the right or the left respectively of the electromagnet 8, or, both positions sensors 7 can be arranged jointly in accordance with the representation to the right or to the left on a line parallel to the longitudinal axis L of the hollow body 3 on the same side of the electromagnet 8. As shown in FIG. 11 and FIG. 11*a*, at least four positions sensors 7 can in particular also be arranged lying opposite on the hollow body 3 such that the strength of the differential signal only depends on the axial displacement of the sample 6, whereas a radial displacement is not detected, with the measuring apparatus 1 in accordance with the invention also being able to include only one position sensor 7.

Furthermore, the sample 6 can, as shown in FIGS. 12 to 14*a*, have one or more position transducers 14 which cooperate with the position sensor 7 to determine the position X of the sample 6. The sensitivity of the measuring apparatus can be increased, and under certain circumstances a large decoupling of the position sensor 7 from the magnetization M of the magnetic sample 6 can be achieved, by the use of position transducers 14 in the sample 6. Depending on the kind of position sensor 7 used, the position transducer 14 can include permanently magnetic components, ferromagnetic components, electrically conductive components, optical components or other components.

Figure 12:
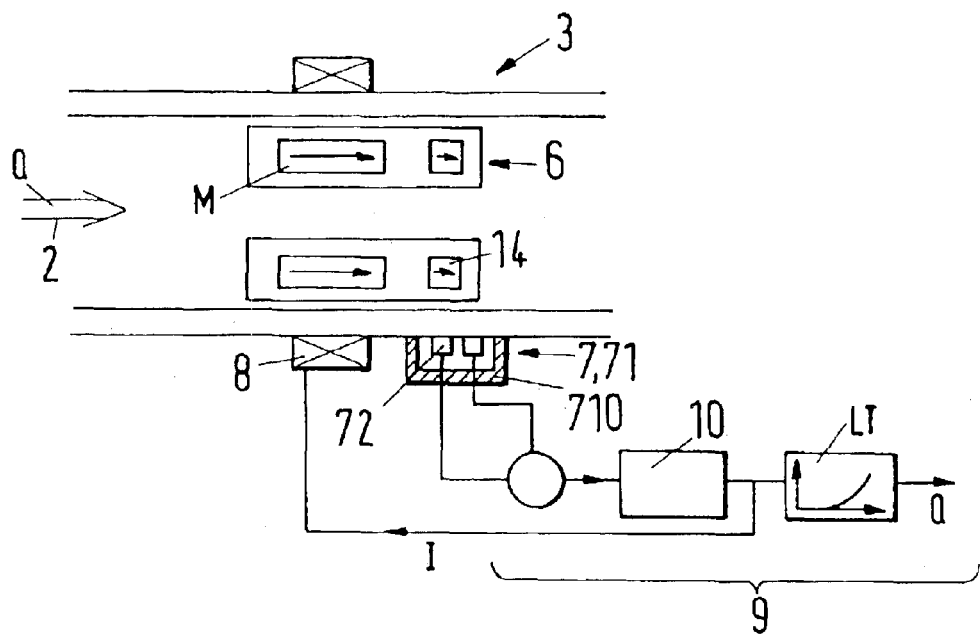
FIG. 12 shows an embodiment in accordance with FIG. 11 with a position transducer.
Figure 12A:
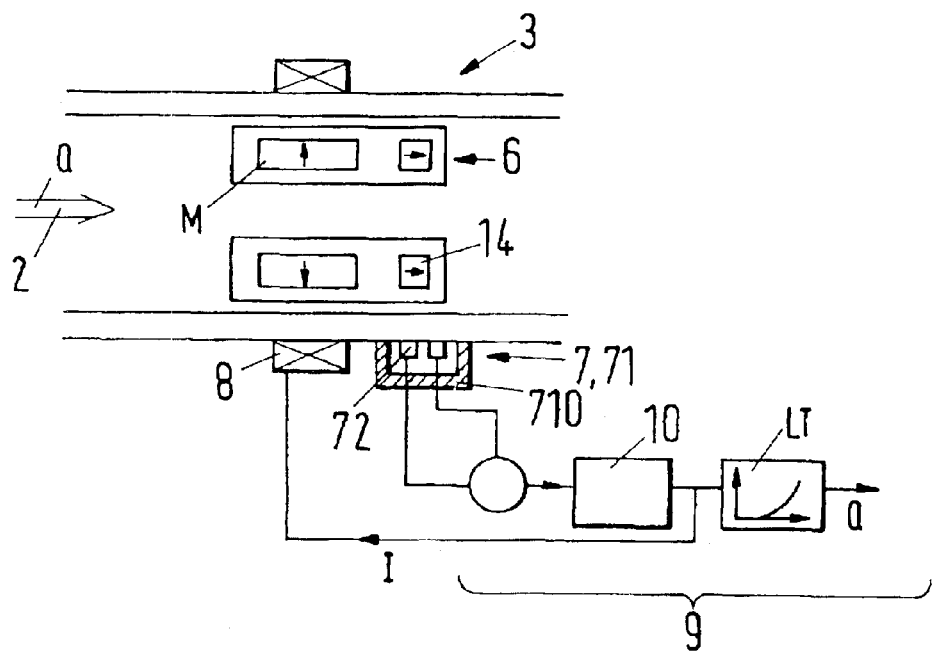
FIG. 12a shows a second embodiment in accordance with FIG. 12 with a radially magnetized sample.

In the embodiment shown in FIG. 12, the position sensor 7 includes a magnetic field sensor 71 which can be made up, for example, of two Hall probes 72 which supply a corresponding differential signal to the regulation means 10 of the control device 9 via a bridge circuit so that the electromagnet 8 can be correspondingly controlled. The magnetic field sensor 71 can also have a Hall probe 72, with the magnetic field sensor 71 having a shielding 710 which shields the magnetic field sensor 71 from external magnetic fields, in particular from the electromagnet 8. The magnetic field sensor 71 cooperates with the position transducer 14 which includes a magnetic material, in particular a permanently magnetic material.

Figure 13:
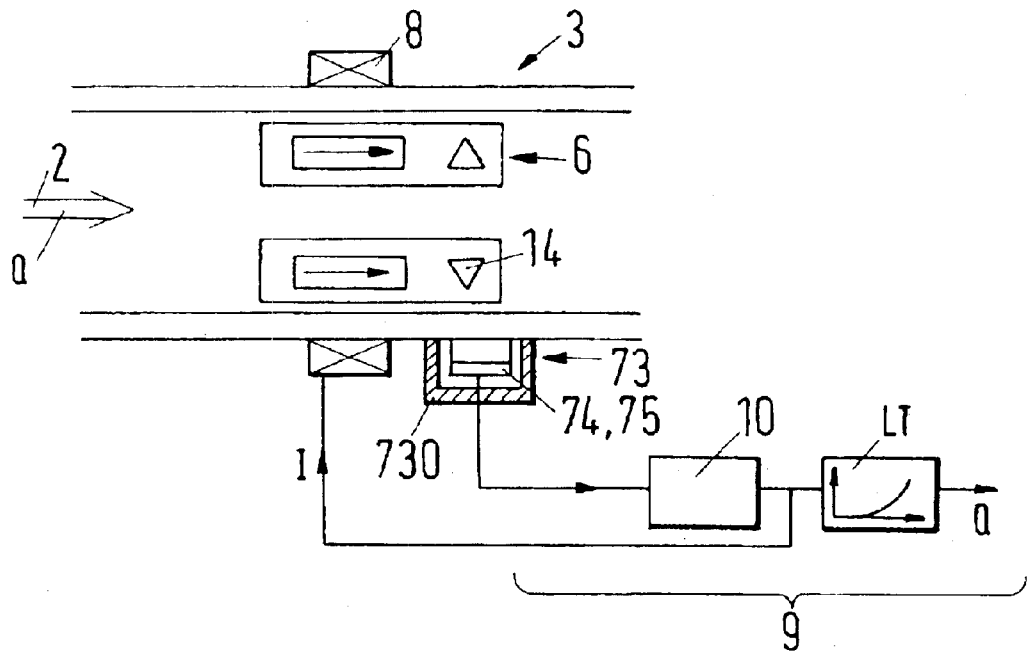
FIG. 13 shows an embodiment of a measuring apparatus with a position transducer and a differential field sensor.
Figure 13A:
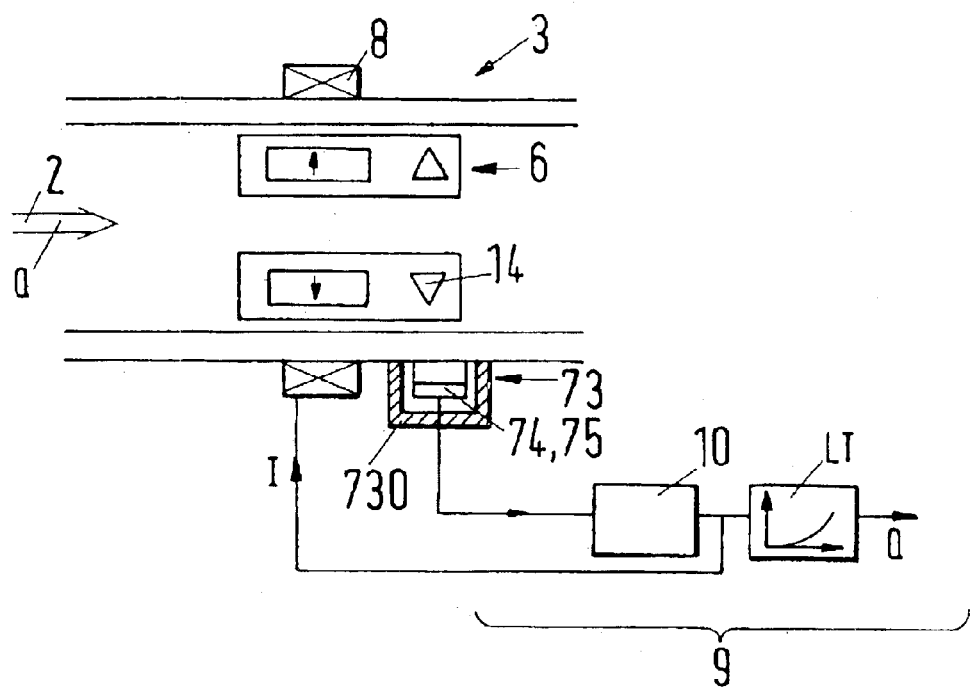
FIG. 13a shows a second embodiment in accordance with FIG. 13 with a radially magnetized sample.

In the embodiment shown in FIG. 13 and FIG. 13a, the position sensor 7 includes a differential field sensor 73, which can include a GMR sensor 74 (giant magnetoresistive sensor) or an LVDT 75 (linear variable differential transformer), with the differential field sensor supplying a corresponding differential signal to the regulating means 10 of the control device 9 so that the electromagnet 8 can be correspondingly controlled, with the differential field sensor 73 being able to have a shielding 730 which shields the differential field sensor 73 from external magnetic fields, in particular from the electromagnet 8. The differential field sensor 73 cooperates with the position transducer 14 which includes a ferromagnetic material F such as iron, another ferromagnetic material F or a permanently magnetic material.

Figure 14:
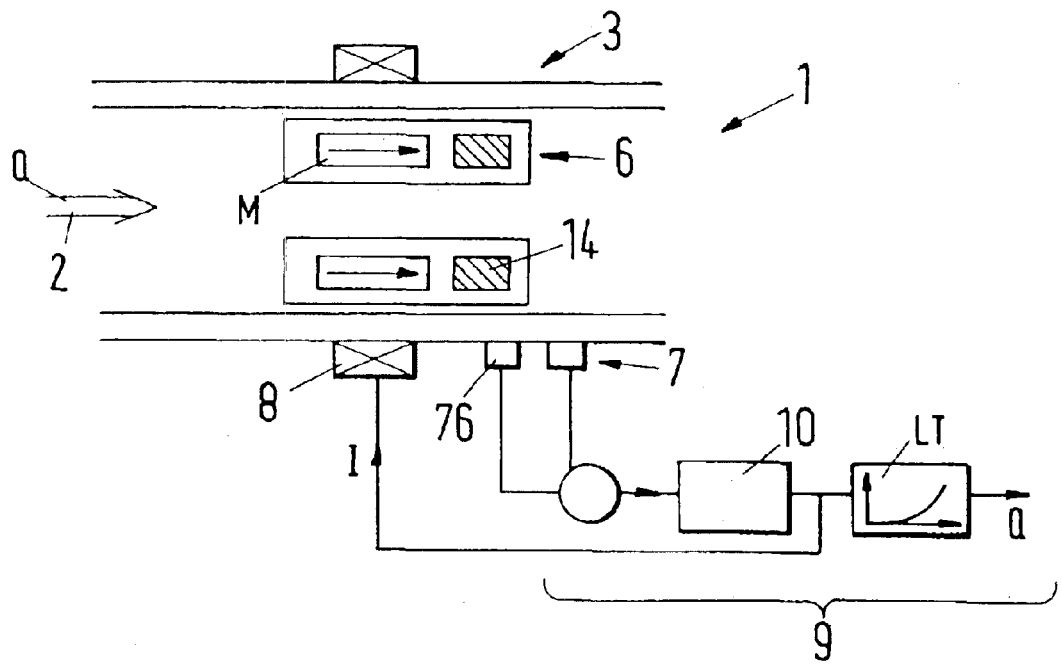
FIG. 14 shows a third embodiment in accordance with FIG. 13 of a measuring apparatus with a position transducer and an eddy current sensor.
Figure 14A:
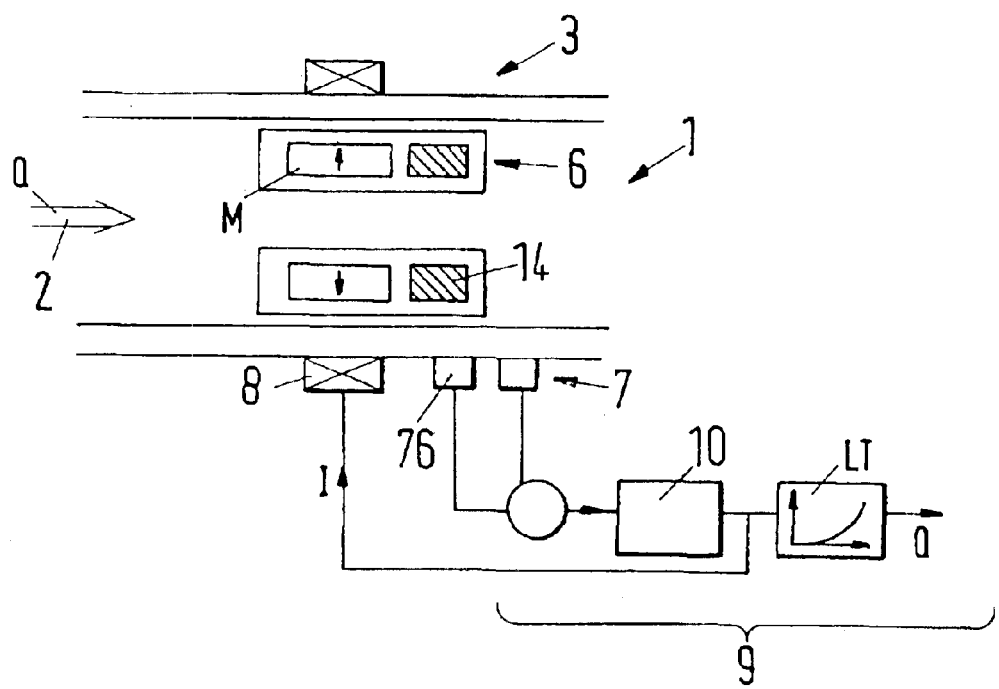
FIG. 14a shows a fourth embodiment in accordance with FIG. 13 with a radially magnetized sample.

FIG. 14 and FIG. 14a each show an embodiment of a measuring apparatus 1 in accordance with the invention which is fitted as a position sensor 7 with at least one eddy current sensor 76. Preferably, but not necessarily, two eddy current sensors 76 are present which supply a corresponding differential signal to the regulating means 10 of the control device 9 in a bridge circuit so that the electromagnet 8 can be correspondingly controlled. The eddy current sensor 76 cooperates with the position transducer 14 which preferably includes a metallic material as the sensor target.

As already mentioned, the measuring apparatus 1 in accordance with the invention can also be fitted and operated such that the flow Q through the hollow body 3 can be controlled and/or regulated by a suitable positioning of the sample 6 in the hollow body 3.

Figure 15:
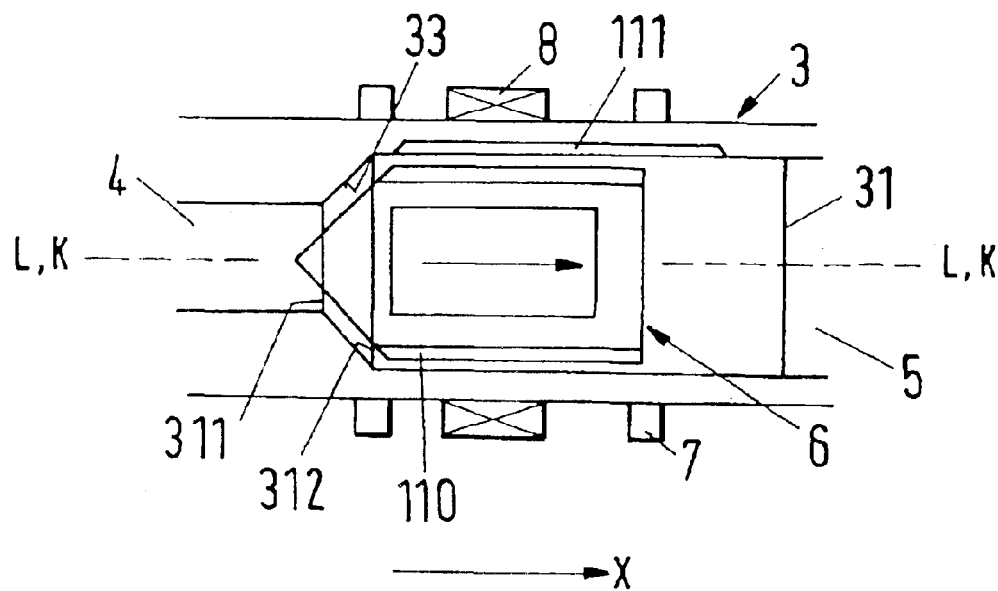
FIG. 15 shows a hollow body with an expanding flow cross-section with the possibility of regulating the flow amount.
Figure 15A:
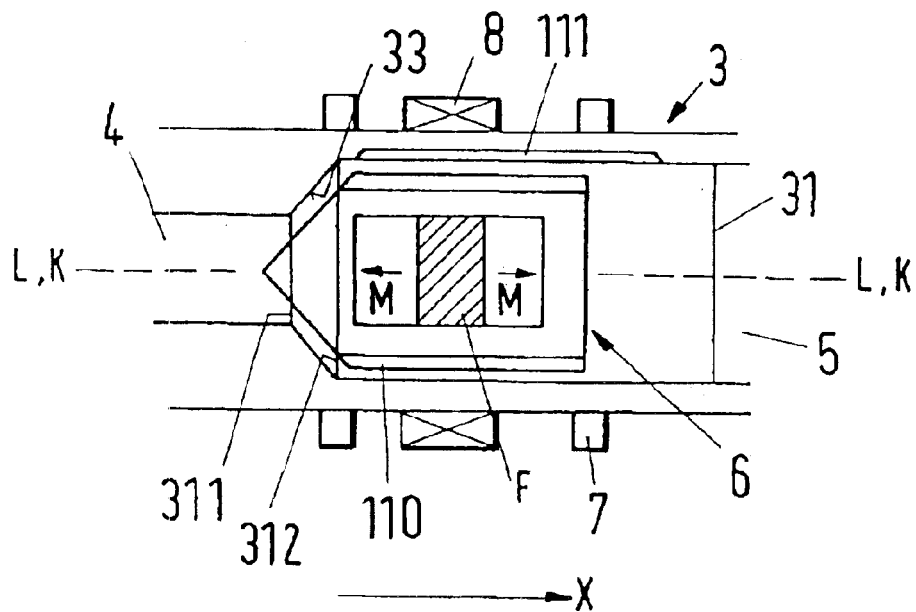
FIG. 15a shows a second embodiment in accordance with FIG. 15 with a sample magnetized in axially opposite directions and with flow bundling.

FIG. 15 and FIG. 15a each show an embodiment of the measuring apparatus 1 in accordance with the invention in which the flow cross-section 31 of the hollow body 3 varies along the longitudinal axis L, and the cross-section area along the body axis K, varies in accordance with a pre-settable scheme, for example conically. In the preferred embodiment shown in FIG. 15 and FIG. 15a, the flow cross-section 31 of the hollow body 3 expands conically, starting from the inflow 4 in the direction of the outflow 5, from a first flow cross-section 311 to a second flow cross-section 312. The side of the sample 6 facing the inflow 4 of the hollow body 3 expands correspondingly from a smaller diameter of a cross-sectional area of the sample 6 to a larger diameter of a cross-sectional area of the sample 6 such that the sample 6 cooperates with an inner surface 33 of the hollow body such that the flow Q depends on the spacing of the sample 6 from the inflow 4 or to the outflow 5. The sample 6 is in particular designed such that the sample 6 cooperates with the inner surface 33 of the hollow body 3 such that the flow Q of the fluid 2 through the hollow body 3 can be completely stopped by a suitable positioning of the sample 6. The sample 6 preferably has a cut-out 110 and/or the hollow body 3 has a guide passage 111 which form a passage for the fluid 2 so that the fluid 2 can flow or not flow in dependence on the position X of the sample 6 in the hollow body 3 between the sample 6 and the inner surface 33 of the hollow body 3 from the inflow 4 to the outflow 5. To satisfy the same function, the sample 6 can also have one or more bores 11, not shown in FIG. 15, in accordance with FIG. 1. With this embodiment of the measuring apparatus 1 in accordance with the invention, the flow Q of the fluid 2 through the hollow body 3 can be determined as described above, on the one hand; the flow Q of the fluid 2 can also be controlled and/or regulated, on the other hand, in that a force is exerted on the magnetic sample 6 by the electromagnet 8 such that the sample 6 is brought into a pre-settable position X and is held there.

Figure 15B:
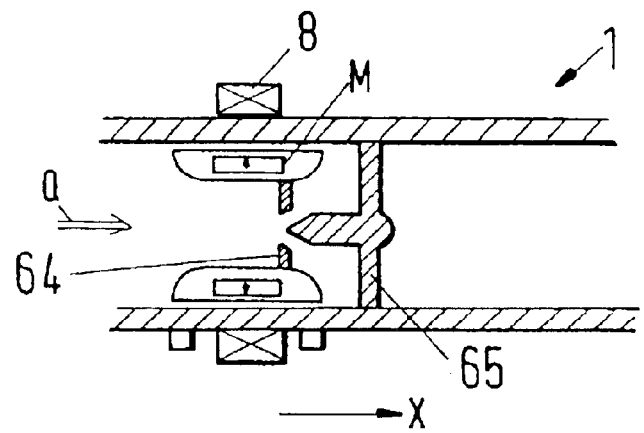
FIG. 15b shows another embodiment with the possibility of regulating the flow amount.

A further embodiment of a measuring apparatus 1 is shown in FIG. 15b which allows a change in the flow Q of the fluid 2. The magnetic sample 6 has an orifice 64 which cooperates with a flow limiter 65 such that the flow Q can be regulated by a change in the position X of the sample 6, i.e. by a change in the spacing of the orifice 64 from the flow limiter 65, with the flow limiter 65 being designed and arranged in the hollow body 3 such that the fluid 2 can flow through and/or about the flow limiter 6, provided that the position X of the sample 6 allows a flow Q of the fluid 2 through the hollow body 3, with it in particular also being possible with the measuring apparatuses 1, which are shown schematically in FIG. 15 to FIG. 15b, to optimize the resolution of the measuring apparatus 1 for special requirements or to match it to special measuring ranges for the flow Q. The pressure drop over the sample 6 can thus, for example, be kept constant by setting a fixed value of the electrical current I, which feeds the electromagnet 8, such that the flow Q of the fluid 2 can be determined from the position X of the sample 6, with the position X of the zero position being able to be adapted individually for each measurement by the control device 9 in dependence on the demand. This means that one and the same measuring device can be configured for different measuring ranges of the flow Q, and the measuring range can even be adapted during operation, by a suitable selection of the zero position. A viscosity dependence of the flow measurement can in particular be substantially eliminated, at least greatly reduced, by a suitable selection of the position X of the sample 6.

Figure 16:
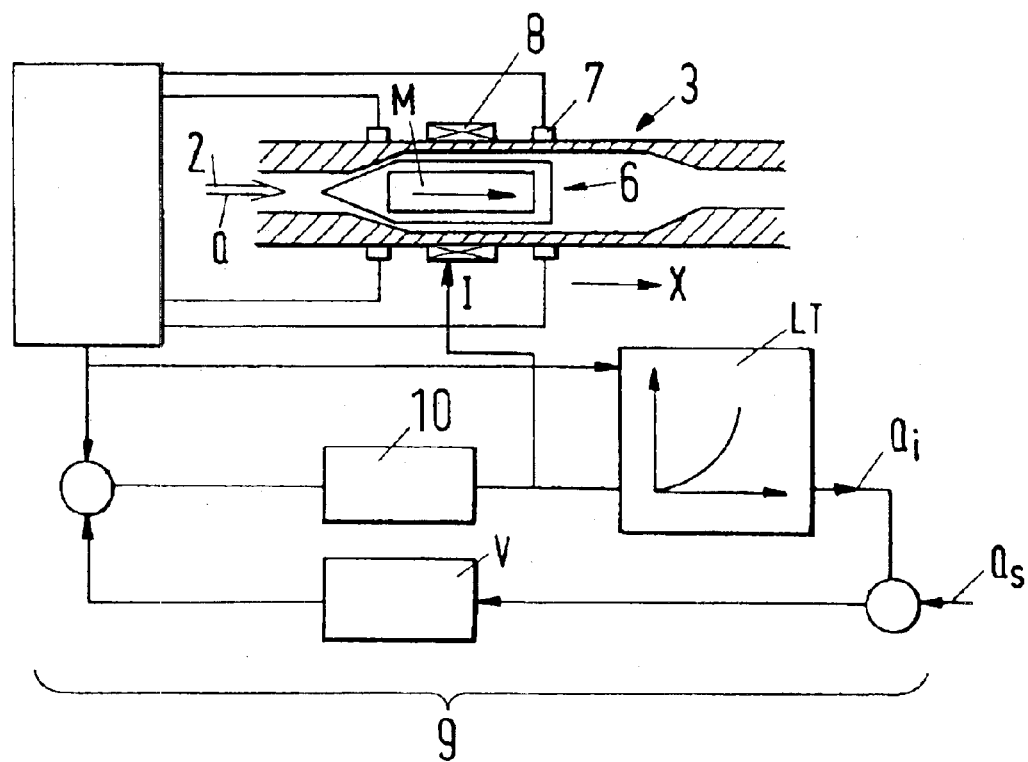
FIG. 16 shows a measuring apparatus with a hollow body in accordance with FIG. 15 and with a control unit with an outer feedback loop.
Figure 16A:
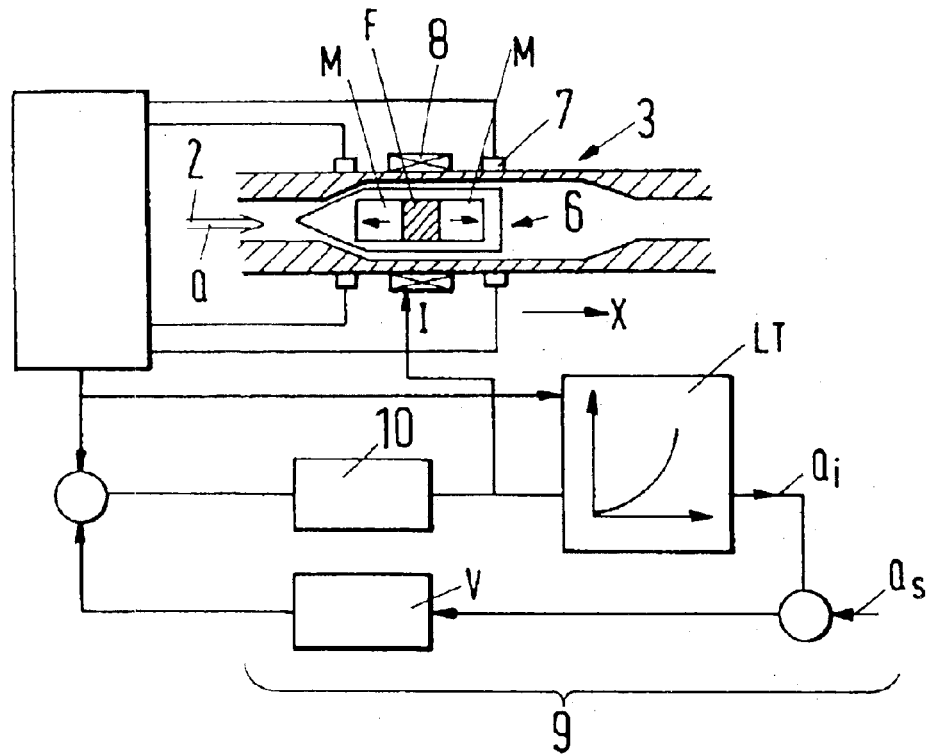
FIG. 16a shows a second embodiment in accordance with FIG. 16 with a sample magnetized in axially opposite directions and with flow bundling.

In the preferred embodiment shown in FIG. 16 and FIG. 16a, the control apparatus 9 includes, in addition to the regulating means 10, a valve regulator V which is arranged in an outer feedback loop and which compares a pre-settable desired value $Q_s$ for the flow Q of the fluid 2 through the hollow body 3 with an actual value $Q_I$ determined from the controlled variable, for example from the magnitude of the electrical current I through the electromagnet 8. The valve regulator V is connected signal-wise, like the position sensors 7, to the regulating means 10 which preferably include a PI controller, a PID controller or a state controller, with the regulating means 10 controlling the electromagnet 8 such that the pre-set desired value $Q_s$ of the flow Q of the fluid 2 is regulated. To determine the nominal value $Q_I$ of the actual flow Q of the fluid 2 through the hollow body 3, a look-up table LT is preferably used which can be represented by a two-dimensional or by a multi-dimensional data field, such as is shown schematically in FIG. 17, which associates an actual value $Q_I$ of the flow Q of the fluid 2 through the hollow body 3 with a value of the controlled variable, that is the current I, while taking into account different parameters such as the position X of the sample 6 in the hollow body 3, the temperature T or the pressure P of the fluid 2 and/or different characteristic values of the fluid 2 such as the viscosity η or other characteristic values, with said value then being supplied together with the preset desired value $Q_s$ for the flow Q of the fluid 2 to the valve regulator V.

The measuring apparatus 1 in accordance with the invention can thus also be used in one of the previously described embodiments, in particular in the embodiment in accordance with FIG. 16 and FIG. 16a, to determine a characteristic value of the fluid 2, in particular the viscosity η and/or the density ρ and/or other characteristic values and/or parameters of the fluid 2. For this purpose, the sample 6 is preferably held at a pre-settable position X, for example in the zero position or at another position X, by the magnetic force of the electromagnet 8 with a constant flow Q. If, with a constant flow Q of the fluid 2, a characteristic value of the fluid, for example the viscosity η or the density ρ or another characteristic value, changes in dependence on the time, generally the value of the electrical current I flowing through the electromagnet 8 must be adapted correspondingly if the sample 6 is intended to maintain the pre-set position X in the hollow body 3. Analogously to the previously described method, the corresponding characteristic value and/or its change can be determined from the value and/or the change of the electrical current I through the electromagnet 8 using a corresponding look-up table LT with a given flow Q.

Since the precision of the determination of a characteristic value, of a parameter, or of the flow Q of the fluid 2 also depends, among other things, on the flow Q of the fluid 2 itself, a measuring apparatus 1 with an adjustable measuring precision is made available by the previously described embodiment. The measuring precision of the measuring apparatus 1 can thus be changed, for example, in that the sample 6 is held at a different pre-settable position X which corresponds to a different flow Q of the fluid 2.

Figure 16B:
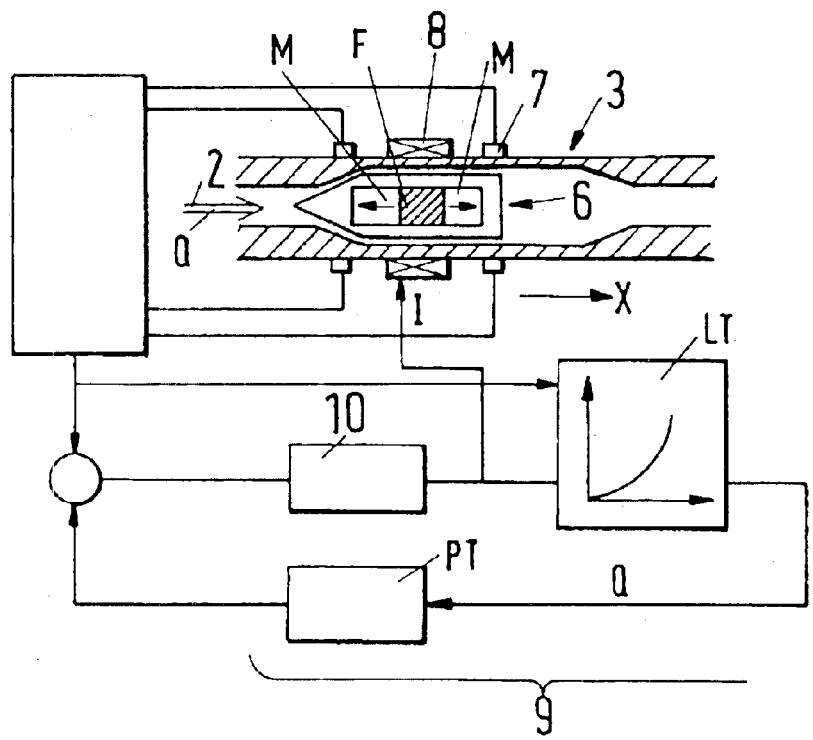
FIG. 16b shows a third embodiment in accordance with FIG. 16.

A measuring apparatus 1 is shown schematically in FIG. 16b with a control device 9 which is suitable for controlling the electromagnet 8 in dependence on the flow Q of the fluid 2 such that the sample 6 is held at a pre-settable position X. For this purpose, the control device 9 includes a position table PT with the aid of which a signal can be generated from a measured flow Q of the fluid 2 through the hollow body 3 such that the sample 6 can be positioned at a pre-settable position X.

Figure 17:
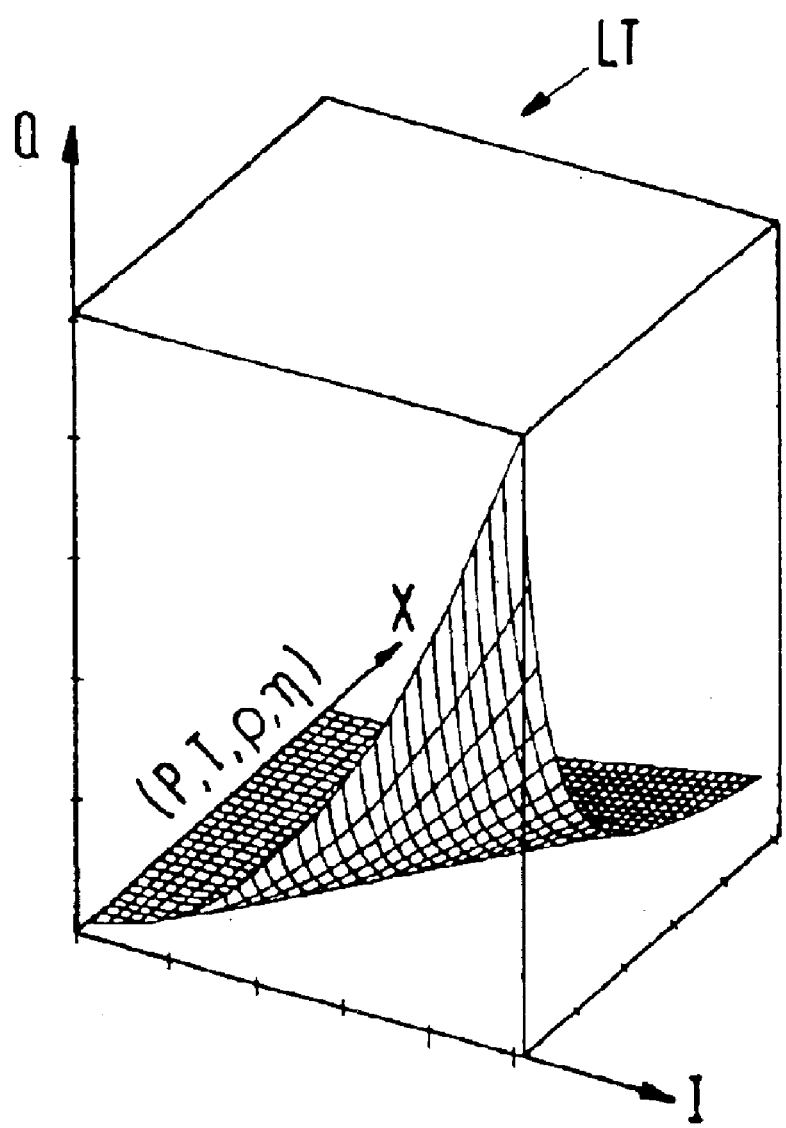
FIG. 17 is schematically, a representation of a multi-dimensional look-up table in the form of a curve diagram.

Finally, FIG. 17 shows, in a schematic representation, a look-up table LT which allows the flow Q of the fluid 2 to be determined as a function of the current I through the electromagnet 8 and of the position X of the sample 6. Such a look-up table LT also allows certain parameters of the fluid 2, such as the density ρ, the viscosity η, the pressure P and the temperature T to be taken into account under certain circumstances with the aid of suitable data or, vice versa, to determine them.

A particularly simply desired apparatus is thus provided with the measuring apparatus in accordance with the invention to determine the flow of a fluid through a hollow body. The flow of the fluid can be determined in a simple manner, for example with the aid of a look-up table, directly from the electrical current which has to be supplied to an electromagnet to hold a sample body arranged in the hollow body, i.e. in the flowing fluid, at a pre-settable position, preferably in a stable zero position. In a preferred variant, in particular no additional force is necessary to stabilize the sample in the stable zero position, that is in that position which the sample adopts without flow of the fluid. Since the sample is arranged directly in the flowing fluid, no additional devices are required outside the hollow body to detect the pressure differential built up by the fluid. The design of the measuring apparatus in accordance with the invention is thereby substantially simplified in comparison with the prior art. No substantial displacement of the sample with respect to the hollow body preferably takes place in the operating state, which in particular results in the described advantages. Furthermore, the proposed measuring apparatus can be used in a very flexible manner, it is in particular also suitable to regulate the flow and to determine different parameters or characteristic values of the fluid and can be optimized to different measuring ranges of the flow.

What is claim is:

1. A measuring apparatus to determine the flow of a fluid, comprising a hollow body, which has an inflow and an outflow for the fluid and in which a magnetic sample including a permanent magnet is movably arranged which can be acted upon with a working pressure by the fluid, at least one position sensor to determine the position of the magnetic sample, an electromagnet to exert a magnetic force on the magnetic sample, and a control device for the electromagnet which is connected signal-wise to the position sensors, the control device including regulating means which control the electromagnet with the aid of a signal of the position sensor such that the magnetic sample is held in a position against the working pressure, the magnetic sample being designed and arranged such that the fluid can flow through the hollow body from the inflow to the outflow.

2. A measuring apparatus in accordance with claim 1, in which the magnetic sample is held in a pre-settable position.

3. A measuring apparatus in accordance with claim 1, in which the sample body is magnetized in the axial direction.

4. A measuring apparatus in accordance with claim 3 in which the sample is magnetized in opposite axial directions.

5. A measuring apparatus in accordance with claim 1, in which the sample is magnetized in the radial direction.

6. A measuring apparatus in accordance with claim 1, in which the hollow body has a circular flow cross-section.

7. A measuring apparatus in accordance with claim 1, in which the flow cross-section of the hollow body varies in accordance with a pre-settable scheme along a longitudinal axis.

8. A measuring apparatus in accordance with claim 1, in which the magnetic sample has one of a ring shape and a plate shape.

9. A measuring apparatus according to claim 8 wherein the magnetic sample has the shape of a circular plate.

10. A measuring apparatus in accordance with claim 1, in which a cross-sectional area of the magnetic sample varies in accordance with a pre-settable scheme along a body axis.

11. A measuring apparatus in accordance with claim 1, wherein the magnetic sample has at least one bore through which fluid flows in the operating state.

12. A measuring apparatus in accordance with claim 1, which includes securing means to stabilize the position of the magnetic sample.

13. A measuring apparatus in accordance with claim 12 wherein the securing means stabilizes a radial position of the magnetic sample.

14. A measuring apparatus in accordance with claim 1, in which a separate overflow line for the fluid connects the inflow of the hollow body to the outflow of the hollow body.

15. A measuring apparatus in accordance with claim 1, in which the magnetic sample has a jacket.

16. A measuring apparatus in accordance with claim 1, in which the magnetic sample has a position transducer to cooperate with the position sensor.

17. A measuring apparatus in accordance with claim 1, in which the regulating means include an electronic regulator which is designed as a PI controller, as a PID controller or as a state controller.

18. A measuring apparatus in accordance with claim 1, having an evaluation unit which determines the flow of the fluid through the hollow body with the help of the electrical energy required for the excitation of the electromagnet.

19. A method of determining the flow of a fluid by means of a measuring apparatus, which has:
- a hollow body with an inflow and an outflow for the fluid and a magnetic sample with a permanent magnet movably arranged in the body;
- an electromagnet to exert a magnetic force on the magnetic sample;
- a control unit for the electromagnet which is connected signal-wise to at least one position sensor to determine a position of the magnetic sample, the method comprising
- flowing the fluid through the hollow body from the inflow to the outflow such that the magnetic sample with the permanent magnet is acted upon by a working pressure generated by the flowing fluid, electrically controlling the electromagnet with the aid of a signal of the position sensor such that the magnetic sample with the permanent magnet is held in a position against the working pressure, and determining the flow of the fluid from the electrical energy required by the electromagnet for holding the magnetic sample with the permanent magnet in the position.

20. A method in accordance with claim 19, including controlling the electromagnet such that the magnetic sample with the permanent magnet is acted upon with a constant working pressure independently of the flow of the fluid.

21. A method in accordance with claim 19, including controlling the electromagnet such that the magnetic sample with the permanent magnet is acted upon with a constant working pressure in dependence on the flow of the fluid.

22. A method in accordance with claim 19, wherein determining the flow comprises determining at least one of the position of the magnetic sample with the permanent magnet and a current through the electromagnet.

23. A method in accordance with claim 19, including oscillating the magnetic sample with the permanent magnet about the axial position with the aid of the electromagnet, and from the oscillations of the magnetic sample with the permanent magnet determining a viscosity of the fluid.

24. A method according to claim 19 including determining at least one of a viscosity and a density of the fluid.

25. A method according to claim 19 including using the flow of the fluid for controlling at least one of a valve and a flow regulating system for a fluid.

* * * * *

UNITED STATES PATENT AND TRADEMARK OFFICE
CERTIFICATE OF CORRECTION

PATENT NO. : 6,898,984 B2
DATED : May 31, 2005
INVENTOR(S) : Reto Schoeb

It is certified that error appears in the above-identified patent and that said Letters Patent is hereby corrected as shown below:

Column 20,
Line 23, delete "sensors" and replace it with -- sensor --.

Signed and Sealed this

Ninth Day of May, 2006

JON W. DUDAS
*Director of the United States Patent and Trademark Office*